US011029591B2

United States Patent
Nagahara

(10) Patent No.: US 11,029,591 B2
(45) Date of Patent: Jun. 8, 2021

(54) LIGHT SOURCE DEVICE AND OPTICAL ENGINE

(71) Applicant: NICHIA CORPORATION, Anan (JP)

(72) Inventor: Seiji Nagahara, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/821,309

(22) Filed: Mar. 17, 2020

(65) Prior Publication Data

US 2020/0301156 A1 Sep. 24, 2020

(30) Foreign Application Priority Data

Mar. 22, 2019 (JP) .............................. JP2019-054511

(51) Int. Cl.
*G03B 21/20* (2006.01)
*G02B 27/14* (2006.01)
*G02B 27/10* (2006.01)

(52) U.S. Cl.
CPC ....... *G03B 21/208* (2013.01); *G02B 27/1006* (2013.01); *G02B 27/141* (2013.01); *G02B 27/149* (2013.01); *G03B 21/2013* (2013.01); *G03B 21/2033* (2013.01); *G03B 21/2066* (2013.01)

(58) Field of Classification Search
CPC .............. G02B 27/1006; G02B 27/141; G02B 27/149; G02B 27/283; G03B 21/2013; G03B 21/2033; G03B 21/2066; G03B 21/208
See application file for complete search history.

(56) References Cited

U.S. PATENT DOCUMENTS

| 8,690,343 | B2 * | 4/2014 | Tanaka ............... G03B 21/2013 353/31 |
| 9,645,315 | B2 * | 5/2017 | Chen .................... G02B 6/2706 |
| 9,829,637 | B2 * | 11/2017 | Chen .................... G02B 6/4244 |
| 9,977,319 | B2 * | 5/2018 | Ogino .................... F21V 29/70 |
| 10,652,509 | B2 * | 5/2020 | Akiyama ............... G03B 33/12 |
| 10,877,364 | B2 * | 12/2020 | Akiyama ............. H04N 9/3161 |
| 2003/0147055 | A1 | 8/2003 | Yokoyama |
| 2006/0103939 | A1 | 5/2006 | Zheng |
| 2010/0328632 | A1 | 12/2010 | Kurosaki et al. |

(Continued)

FOREIGN PATENT DOCUMENTS

| JP | 2000-112031 A | 4/2000 |
| JP | 2004-070072 A | 3/2004 |

(Continued)

*Primary Examiner* — Bao-Luan Q Le
(74) *Attorney, Agent, or Firm* — Squire Patton Boggs (US) LLP

(57) ABSTRACT

A light source device includes a plurality of laser modules and a beam combiner. Each laser module includes a first laser diode configured to emit a first laser beam and a second laser diode configured to emit a second laser beam. The beam combiner has a first dichroic mirror region and a second dichroic mirror region. The first dichroic mirror region is configured to transmit the first laser beam going out from the first laser module, and to reflect the second laser beam going out from the second laser module. The second dichroic mirror region configured to transmit the second laser beam going out from the first laser module, and to reflect the first laser beam going out from the second laser module.

17 Claims, 17 Drawing Sheets

(56) References Cited

U.S. PATENT DOCUMENTS

| | | | |
|---|---|---|---|
| 2012/0092624 A1 | 4/2012 | Oiwa et al. | |
| 2012/0133903 A1* | 5/2012 | Tanaka | G03B 21/204 |
| | | | 353/31 |
| 2016/0238790 A1* | 8/2016 | Chen | G02B 6/4208 |
| 2017/0176845 A1* | 6/2017 | Ogino | F21V 7/05 |
| 2017/0219775 A1* | 8/2017 | Chen | G02B 6/2706 |
| 2017/0343891 A1 | 11/2017 | Sakata et al. | |
| 2019/0124305 A1* | 4/2019 | Akiyama | H04N 9/3167 |
| 2019/0129189 A1* | 5/2019 | Chang | G02B 27/1046 |
| 2019/0219912 A1* | 7/2019 | Akiyama | G03B 21/208 |
| 2019/0285977 A1* | 9/2019 | Tian | G03B 21/2066 |

FOREIGN PATENT DOCUMENTS

| | | |
|---|---|---|
| JP | 2006-251556 A | 9/2006 |
| JP | 2008-003125 A | 1/2008 |
| JP | 2011-013313 A | 1/2011 |
| JP | 2012-088451 A | 5/2012 |
| JP | 2012-133337 A | 7/2012 |
| JP | 2013-138086 A | 7/2013 |
| JP | 2017-116906 A | 6/2017 |
| JP | 2017-215570 A | 12/2017 |

\* cited by examiner

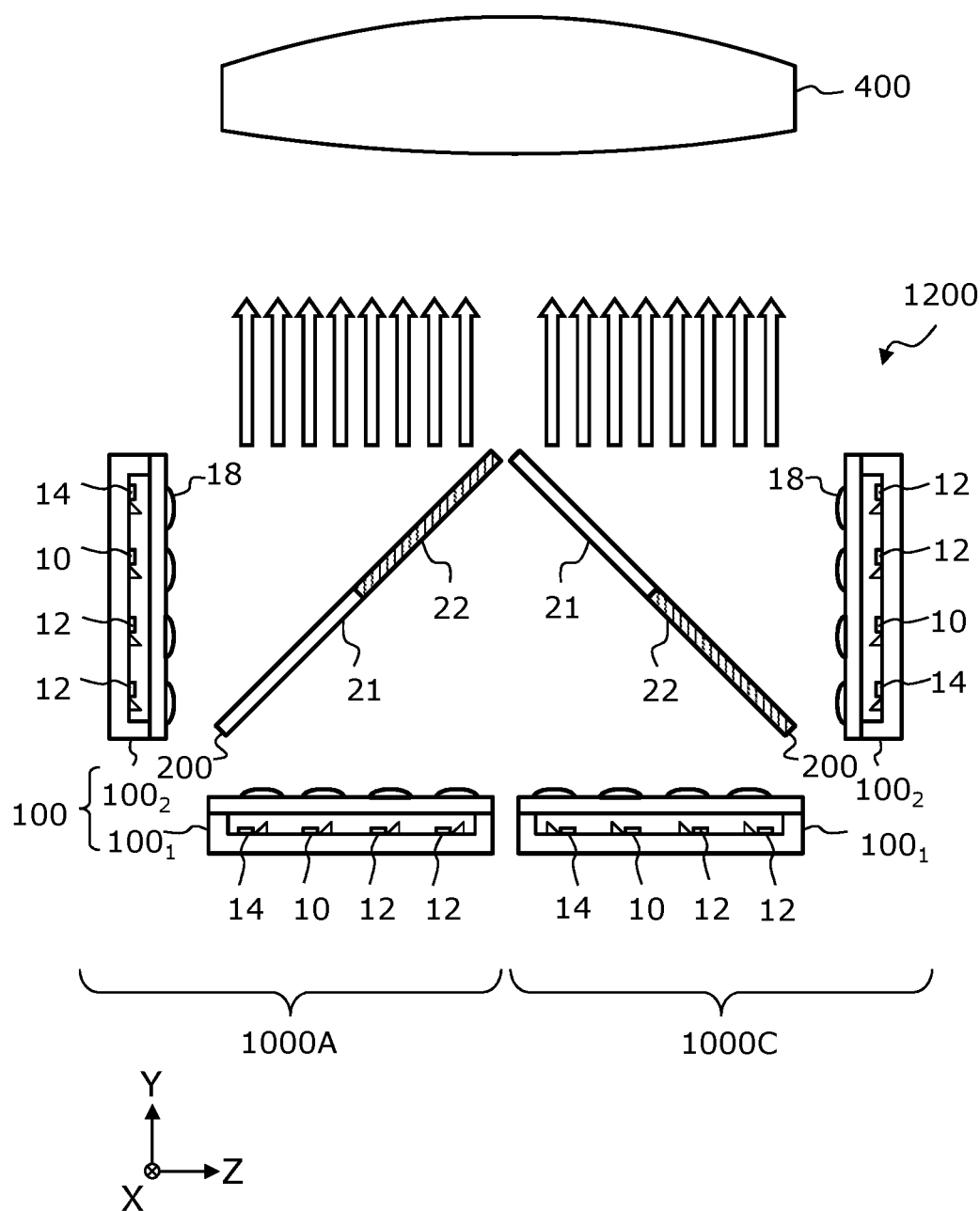

LIGHT SOURCE DEVICE AND OPTICAL ENGINE

CROSS-REFERENCE TO RELATED APPLICATION

This application claims priority to Japanese Patent Application No. 2019-054511 filed on Mar. 22, 2019, the entire contents of which are hereby incorporated by reference.

BACKGROUND

The present disclosure relates to a light source device and an optical engine that includes such a light source device.

Conventional projectors have employed discharge lamps, e.g., ultra-high pressure mercury lamps and xenon lamps, as light sources. In recent years, projectors utilizing light-emitting diodes (LEDs) as the light sources, which excel in terms of power consumption and environmental load as compared to discharge lamps, have been put to practical use.

Semiconductor laser devices (hereinafter referred to as "laser diodes" or simply "LDs") have higher radiance than do LEDs, and are being applied to various fields. Projectors having a hybrid-type light source in which a phosphor is excited by laser beams emitted from LDs, such that light of a necessary wavelength region is obtained, have been put to practical use.

High-radiance light sources which are capable of combining laser beams that are emitted from red, green, and blue LDs, without using any phosphor, are under development. Japanese Laid-Open Patent Publication No. 2012-88451 discloses a light source device which merges laser beams that are emitted from a red laser, a green laser, and a blue laser by using dichroic prisms. Japanese Laid-Open Patent Publication No. 2008-3125 discloses a light source device which merges laser beams of different polarization directions by using a polarization beam combiner.

SUMMARY

A light source device which emits light with an increased radiance and which is suitable for downsizing, and an optical engine that generates illumination light with high in-plane uniformity, are being desired.

Embodiments of the present disclosure provide a light source device with a novel structure which can combine a plurality of laser beams of different wavelength bands for an enhanced radiance, and an optical engine that includes such a light source device.

In one embodiment, a light source device according to the present disclosure includes: a plurality of laser modules including a first laser module and a second laser module, each laser module including at least one first laser diode configured to emit a first laser beam and at least one second laser diode configured to emit a second laser beam; and a beam combiner. The second laser beam has a wavelength which is longer than a wavelength of the first laser beam. The beam combiner includes: a first dichroic mirror region configured to transmit the first laser beam going out from the first laser module, and to reflect the second laser beam going out from the second laser module; and a second dichroic mirror region configured to transmit the second laser beam going out from the first laser module, and to reflect the first laser beam going out from the second laser module. The first laser module is disposed at a position for obliquely irradiating a rear side of the beam combiner with the first laser beam and the second laser beam going out from the first laser module. The second laser module is disposed at a position for obliquely irradiating a front side of the beam combiner with the first laser beam and the second laser beam going out from the second laser module.

In one embodiment, another light source device according to the present disclosure includes: a first laser module, a second laser module, and a third laser module, each including at least one first laser diode configured to emit a first laser beam having a wavelength $\lambda_1$ and being linearly-polarized along a first direction, and at least one second laser diode configured to emit a second laser beam having a wavelength $\lambda_2$ which is longer than the wavelength $\lambda_1$ and being linearly-polarized along the first direction or along a second direction which is orthogonal to the first direction. The light source device further includes a beam combiner disposed between the third laser module and the second laser module and configured to combine the first laser beam and the second laser beam emitted from each of the first laser module, the second laser module, and the third laser module. The beam combiner includes: a first optical film including a first dichroic film configured to transmit light of the wavelength $\lambda_1$ and to reflect light of the wavelength $\lambda_2$; a second optical film including a $\lambda/2$ phase plate for the wavelength $\lambda_2$ configured to rotate a polarization direction of light of the wavelength $\lambda_2$ by 90 degrees, and a second dichroic film configured to transmit light of the wavelength $\lambda_2$, transmit light of the wavelength $\lambda_1$ being polarized along the first direction, and to reflect light of the wavelength $\lambda_1$ being polarized along the second direction, the second optical film and the first optical film being provided side by side along a first plane; a third optical film including a third dichroic film configured to transmit light of the wavelength $\lambda_2$ and to reflect light of the wavelength $\lambda_1$; and a fourth optical film including a $\lambda/2$ phase plate for the wavelength $\lambda_1$ configured to rotate a polarization direction of light of the wavelength $\lambda_1$ by 90 degrees, and a fourth dichroic film configured to transmit light of the wavelength $\lambda_1$, transmit light of the wavelength $\lambda_2$ not passing through the $\lambda/2$ phase plate for the wavelength $\lambda_2$, and to reflect light of the wavelength $\lambda_2$ having passed through the $\lambda/2$ phase plate for the wavelength $\lambda_2$, the fourth optical film and the third optical film being provided side by side along a second plane. The first plane and the second plane intersects at a line of intersection between the first optical film and the second optical film and between the third optical film and the fourth optical film. The first laser module is disposed at a position for obliquely irradiating rear sides of the first optical film, the second optical film, the third optical film, and the fourth optical film with the first laser beam and the second laser beam going out from the first laser module. The second laser module is disposed at a position for obliquely irradiating front sides of the second optical film and the first optical film with the first laser beam and the second laser beam going out from the second laser module. The third laser module is disposed at a position for obliquely irradiating front sides of the third optical film and the fourth optical film with the first laser beam and the second laser beam going out from the third laser module.

In one embodiment, an optical engine according to the present disclosure includes: at least one light source device as any of the above; optics which a laser beam emitted from the at least one light source device is incident to; a spatial light modulator to be irradiated with the laser beam having passed through the optics; and projection optics to project the laser beam having been modulated by the spatial light modulator.

According to various embodiments of the present disclosure, a light source device which can combine a plurality of laser beams of different wavelength bands for an enhanced radiance, and an optical engine that includes such a light source device, are provided.

BRIEF DESCRIPTION OF THE DRAWINGS

FIG. 11B is a diagram showing a light source device according to another variant of the first embodiment.

DETAILED DESCRIPTION

Hereinafter, with reference to the attached drawings, embodiments of the present disclosure will be described in detail. The following embodiments are generic or specific examples. Various implementations that are described in the present specification can be combined with one another, whenever such combination makes sense.

Embodiment 1

Figure 1:
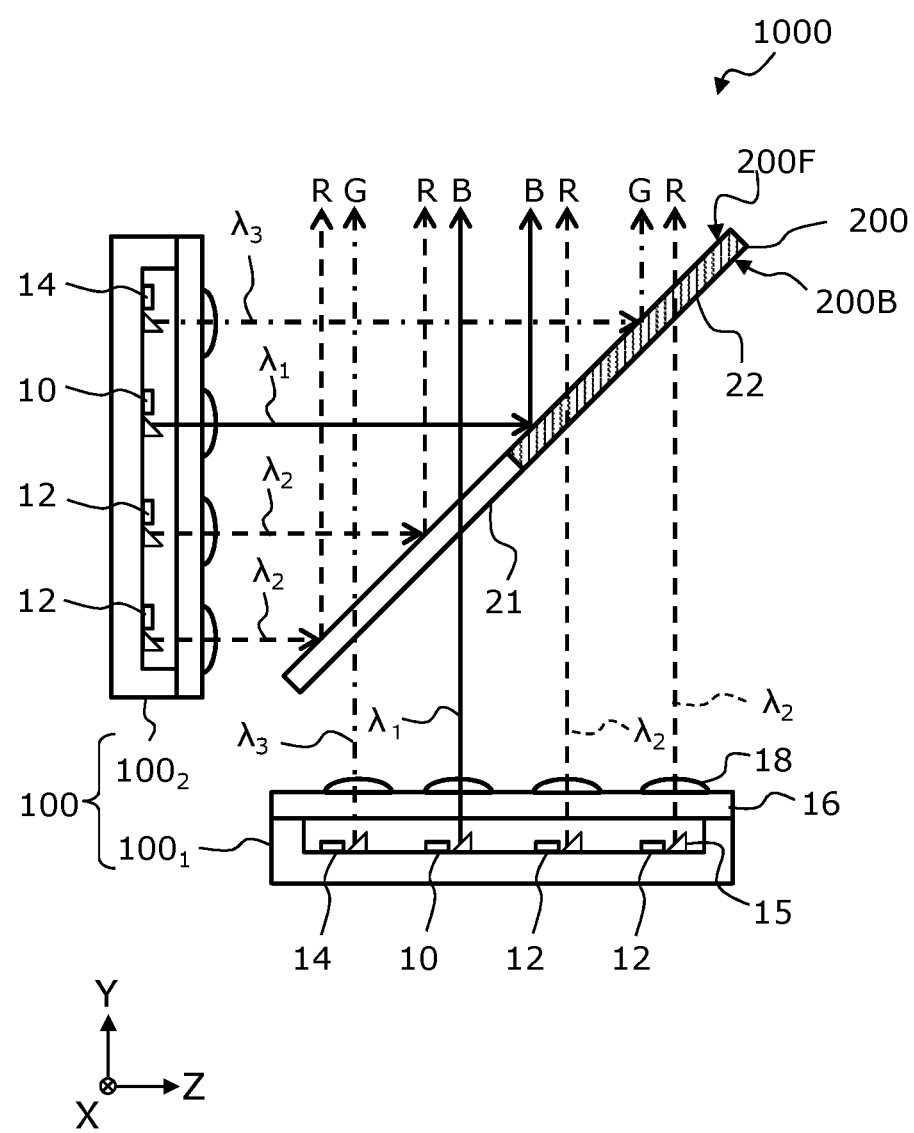
FIG. 1 is a cross-sectional view schematically showing an exemplary arrangement of a light source device according to a first embodiment of the present disclosure.

FIG. 1 is a cross-sectional view schematically showing an exemplary arrangement of a light source device 1000 according to a first embodiment of the present disclosure. In the attached drawings including FIG. 1, the X axis, the Y axis, and the Z axis which are orthogonal to one another are schematically shown for reference. In FIG. 1, the X axis is perpendicular to the plane of the figure, and is oriented in the depth direction. The orientation of the light source device 1000 during use may be arbitrary, without being limited to the illustrated orientation of the light source device 1000.

The light source device 1000 according to the present embodiment includes a plurality of laser modules 100 and a beam combiner 200. Laser beams which are emitted from the plurality of laser modules 100 are merged or combined by the beam combiner 200. The beam combiner 200 functions as a multiplexer. Although an actual laser beam would have a thickness (i.e., a beam diameter) along a direction which is perpendicular to its propagation direction, for simplicity, the attached drawings only illustrate its center axis as a straight line, while ignoring the beam diameter of the laser beam. Since the combined laser beam is to go out in a positive direction along the Y axis, the positive side along the Y axis will be referred to as the "front side", whereas the negative side along the Y axis will be referred to as the "rear side".

In the illustrated example, the plurality of laser modules 100 include a first laser module $100_1$ and a second laser module $100_2$ which are disposed orthogonal to each other. Each of the first laser module $100_1$ and the second laser module $100_2$ includes first laser diodes 10, second laser diodes 12, and third laser diodes 14. Hereinafter, a laser diode will simply be referred to as an "LD".

Each first LD 10 emits a first laser beam of a wavelength $\lambda_1$, whereas each second LD 12 emits a second laser beam of a wavelength $\lambda_2$. The wavelength $\lambda_1$ is shorter than the wavelength $\lambda_2$. Each third LD 14 emits a third laser beam of a wavelength $\lambda_3$, such that the wavelength $\lambda_3$ is between the wavelength $\lambda_1$ and the wavelength $\lambda_2$. As used herein, the "wavelength of a laser beam" is synonymous with the lasing wavelength of the LD, i.e., peak wavelength. Generally speaking, even LDs which are produced under the same conditions and possess the same structure may differ in lasing wavelength from one another, and any given LD may even fluctuate depending on the operating environment. The values of $\lambda_1$, $\lambda_2$ and $\lambda_3$ pertain to wavelength bands of different colors, such that each of them may have some spectral width or variation within the respective color wavelength band. The term "wavelength of a laser beam" will be explained later in more detail.

Figure 2A:
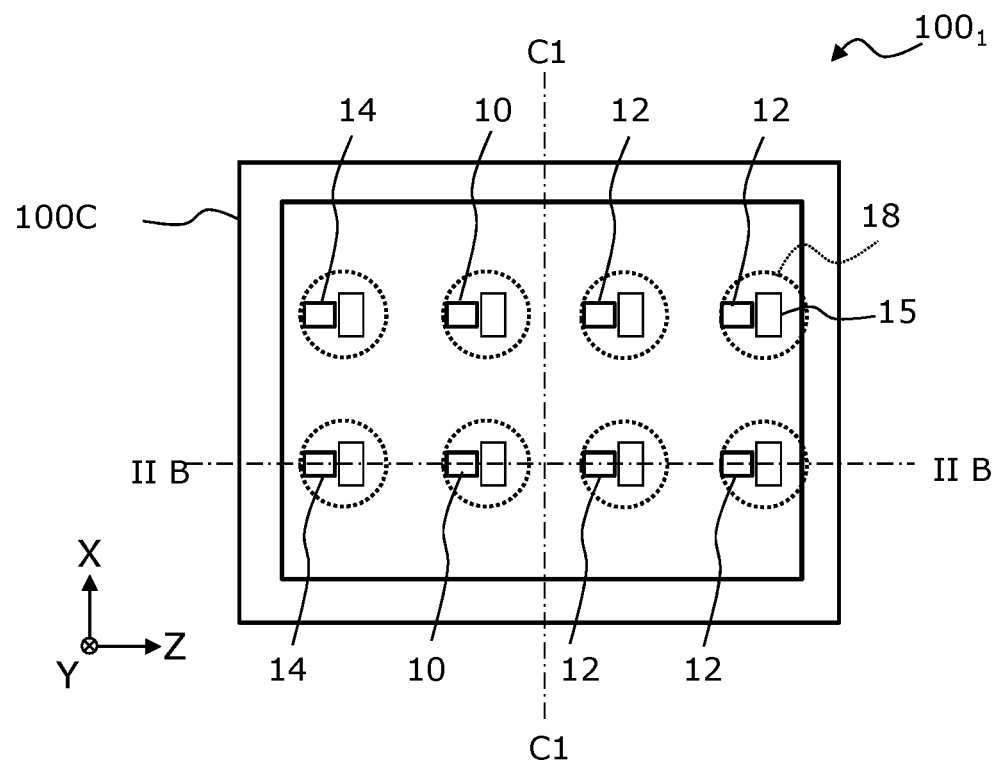
FIG. 2A is a schematic plan view of a first laser module according to the first embodiment.
Figure 2B:
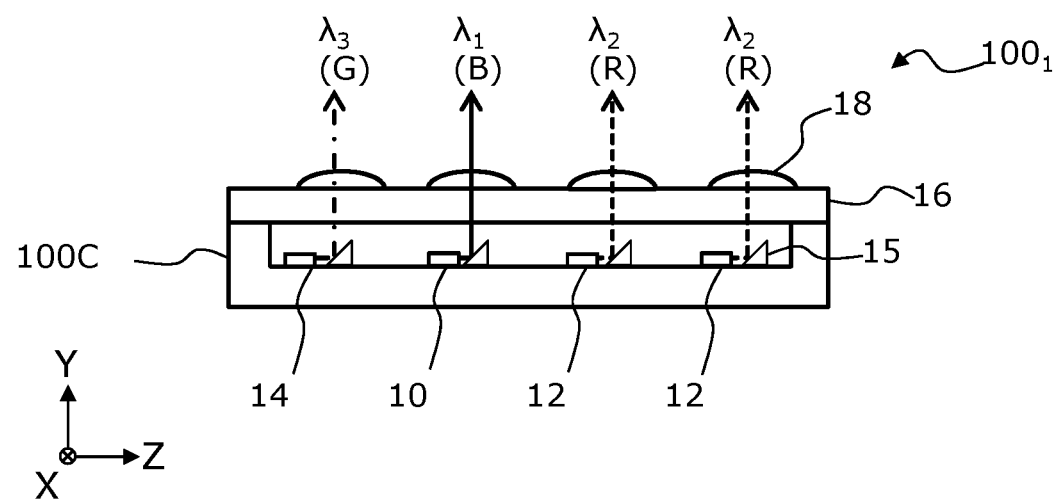
FIG. 2B is a cross-sectional view of the first laser module in FIG. 2A as taken along line IIB-IIB.

Next, with reference to FIG. 2A and FIG. 2B, an exemplary arrangement of the first laser module $100_1$ will be described. The second laser module $100_2$ is similar in structure, shape, and size to the first laser module $100_1$, but differs therefrom with respect to its orientation. Therefore, description concerning the arrangement of the second laser module $100_2$ will not be redundantly repeated here. FIG. 2A is a schematic plan view of the first laser module $100_1$, and FIG. 2B is a cross-sectional view of the first laser module $100_1$ in FIG. 2A as taken along line IIB-IIB.

In the example of FIG. 2A, a total of eight LDs 10, 12 and 14 are disposed in rows and columns (an array of 2 rows by 4 columns) on a principal face of a base (or support) 100C for constructing a package. Specifically, in each row extending along a direction (row direction) which is parallel to the Z axis direction, one third LD 14, one first LD 10, and two second LDs 12 are arranged in this order. In a first column extending along a direction parallel to the X axis direction, two third LDs 14 are arranged in one row along the X axis direction. In a second column, two first LDs 10 are arranged in one row, along the X axis direction. In each of third and fourth columns, two second LDs 12 are arranged in one row along the X axis direction. In the present embodiment, the number of second LDs 12 mounted on one laser module $100_1$ is twice the number of first LDs 10 or twice the number of third LDs 14. The reason for this will be described later.

FIG. 2A shows a border line C1 which divides the eight LDs 10, 12 and 14 into two groups of LDs. In FIG. 2A, on the right side of the border line C1, the LDs 12 which lase at a wavelength that is longer than a reference wavelength A are mounted; on the left side of the border line C1, the LDs 10 and 14 which lase at a wavelength that is shorter than the reference wavelength A are mounted. The technological significance behind such an arrangement, where the two-dimensional array of LDs 10, 12 and 14 is divided into two different regions in accordance with their relatively higher or lower lasing wavelengths with respect to the reference wavelength A, will be described later.

Generally speaking, an LD may be classified as an ultraviolet LD, a blue LD, a green LD, a red LD, or an infrared LD, for example, depending on its lasing wavelength band. When the light source device 1000 is to be used as a light source of visible light, the LDs 10, 12 and 14 are to be selected from among those LDs which emit visible light. In the present embodiment, the first LDs 10 are blue LDs, the second LDs 12 are red LDs, and the third LDs 14 are green LDs. The lasing wavelength of each blue LD is from 430 nm to 480 nm, e.g. from 450 nm to 470 nm. The lasing wavelength of each green LD is from 500 nm to 540 nm, e.g. from 520 nm to 540 nm. The lasing wavelength of each red LD is from 620 nm to 660 nm, e.g. from 630 nm to 650 nm. Therefore, the aforementioned reference wavelength A may be selected within a range from 540 nm to 620 nm, which is between an upper limit value for the lasing wavelength of a green LD and a lower limit value for the lasing wavelength of a red LD, for example.

The blue LDs and the green LDs may mainly be composed of nitride semiconductor materials. Examples of nitride semiconductor materials include GaN, InGaN, and AlGaN, for example. Each red LD may mainly be made of a gallium arsenide-based semiconductor material, for example. If LDs whose lasing wavelength is shorter than the near-infrared region are adopted and their optical output power is increased, dust or the like in the ambient may adhere to an end face (emitter) during operation owing to the optical trapping or optical dust collection effect, thus possibly lowering the optical output power. The substance that adheres to the LDs may not necessarily be dust, but may also be some deposit that is generated as volatilized organic matter chemically reacts the laser beam. Deteriorations associated with adhering matter will be more outstanding as the wavelength of the laser beam becomes shorter and the optical output power higher. In order to avoid this problem, each of the plurality of laser modules 100 may desirably be a hermetic package housing the LDs 10, 12 and 14.

In the present embodiment, as shown in FIG. 2B, a laser beam which is emitted from the end face (emitter) of each LD 10, 12 or 14 along the Z axis direction is reflected by a corresponding mirror 15, so as to change its orientation to the Y axis direction. Each laser beam is transmitted through a light-transmitting member 16 and a collimating lens 18 that are attached to the base 100C, so as to propagate along the Y axis direction. The collimating lens 18 reduces the divergence angle of the diverging laser beam that is emitted from the respective LD 10, 12 or 14, thus collimating it. The orientations of the LDs 10, 12 and 14 are not limited to this example. In FIG. 2B, if the end face of each LD 10, 12 or 14 were oriented in the Y axis direction, for example, a laser beam emitted from each LD 10, 12 or 14 would be incident on the collimating lens 18 without even being reflected by a mirror; in this case, the mirrors can be omitted. Each LD 10, 12 or 14 may be mounted on a metal mount (not shown) that has a high thermal conductivity.

The first laser module $100_1$ and the second laser module $100_2$ are chosen from among a plurality of laser modules 100 having the same arrangement, for example, and are disposed orthogonally as shown in FIG. 1. Each laser module 100 that is included in the light source device 1000 according to the present embodiment includes a plurality of LDs 10, 12 and 14 that emit laser beams of three primary color of red, green, and blue. Since the laser beams which are obtained from the plurality of laser modules 100 are combined (multiplexed) by the beam combiner 200, radiance can be increased approximately twofold.

In the present embodiment, the red LDs have a smaller luminous flux than those of the blue LDs and the green LDs, and therefore the number of second LDs 12 that are mounted on each laser module 100 is twice the number of first LDs 10 or twice the number of third LDs 14. This allows white light to be reproduced, by subjecting the LDs of the respective colors to time division driving. Without being limited thereto, the number of LDs for each color can be adjusted so that necessary light will be obtained.

Without being limited to the above example, the numbers of first LDs 10, second LDs 12, and third LDs 14 may each be one, or two or any number that is three or greater. In one example, the first laser module $100_1$ may be similar in structure, shape, and size to the second laser module $100_2$, but embodiments of the present disclosure are not necessarily limited to this example.

The characteristics of the red LDs may be more susceptible to temperature-dependent fluctuations than are the characteristics of the blue LDs and the green LDs. Moreover, the blue LDs have a greater efficiency of power conversion than that of the green LDs, and therefore the blue LDs generate smaller amounts of heat than do the green LDs. Therefore, the green LDs may desirably be remoted from the red LDs. In the present embodiment, columns of blue LDs (first LDs 10) are disposed between the columns of red LDs (second LDs 12) and the columns of green LDs (third LDs 14). This allows the emission characteristics of the red LDs (second LDs 12) to be stabilized.

In an embodiment of the present disclosure, the lasing wavelength of the first LDs 10 which are mounted on one laser module 100 does not need to be exactly equal to the lasing wavelength of the first LDs 10 which are mounted on the other laser module 100. The same is also true of the second LDs 12. For example, when the first LDs 10 are blue LDs, the lasing wavelength of the first LDs 10 which are mounted on each laser module 100 may be within a range from 430 to 480 nm. Therefore, in the present disclosure, that "the wavelength of a first laser beam is shorter than the wavelength of a second laser beam" means that the lasing wavelengths of the first LDs that are mounted on each laser module are within a first wavelength region (e.g. a blue wavelength region), and that the lasing wavelengths of the second LDs that are mounted on each laser module are within a second wavelength region (e.g. a red wavelength region) that is located on the longer wavelength side of the first wavelength region. Similarly, given that a plurality of first LDs 10 are mounted on a single laser module 100, their lasing wavelengths do not need to be exactly equal. The same is also true of the second LDs 12 and the third LDs 14.

In an optical engine for displaying full-color images, for a broader color gamut, it is desirable for the respective colored light of red (R), green (G), or blue (B) needed for displaying to be monochromatic light of a narrow spectral width that is specific to that color. Therefore, in the case where a light source device according to the present disclosure is applied to such an optical engine, it is preferable for the peak wavelength of a laser beam that is emitted from each LD to be contained within a narrow wavelength range (e.g. a range spanning 12 nm) for the respective color. For example, in the plurality of first LDs 10 being a plurality of blue LDs, the wavelength $\lambda_1$, i.e., the peak wavelength of the first laser beam that is emitted from each first LD 10, may desirably be contained in the range from 459 to 471 nm, for example. In the case of adopting blue LDs which were fabricated so that the design value of their central wavelength would be 465 nm, within the same light source device 1000, the peak wavelengths of the first laser beams that are emitted from the respective first LDs 10 may exhibit different values in a range from 459 to 471 nm, for example. It is considered that this much wavelength variation is not likely to cause image quality deteriorations. Similar degrees of wavelength variation can be tolerated also for the green LDs and red LDs.

Hereinafter, for simplicity, a laser beam which is emitted from a blue LD may be referred to as a B beam, a laser beam emitted from a green LD as a G beam, and a laser beam emitted from a red LD as an R beam. In FIG. 1, the signs "R", "G", and "B" represent an R beam, a G beam, and a B beam, respectively.

Figure 3A:
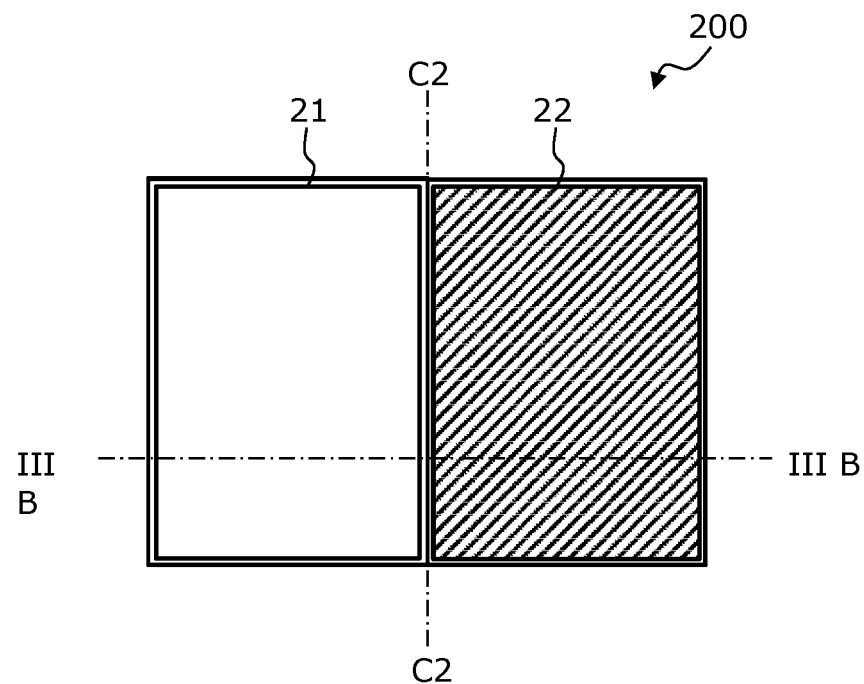
FIG. 3A is a plan view of a beam combiner according to the first embodiment.
Figure 3B:
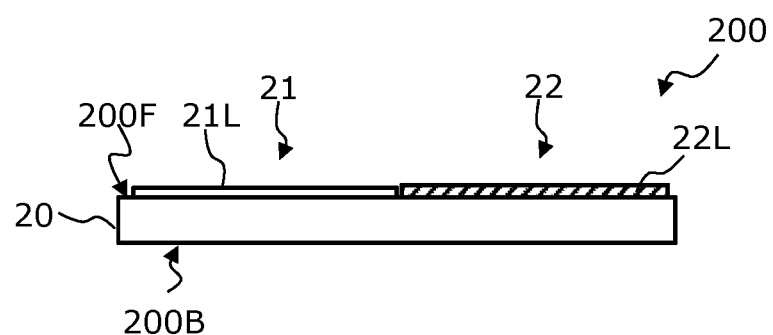
FIG. 3B is a cross-sectional view of the beam combiner in FIG. 3A as taken along line IIIB-IIIB.

Next, with reference to FIG. 3A and FIG. 3B, an exemplary arrangement of the beam combiner 200 will be described. FIG. 3A is a plan view of the beam combiner 200, and FIG. 3B is a cross-sectional view of the beam combiner 200 in FIG. 3A as taken along line IIIB-IIIB.

In the illustrated example, the beam combiner 200 has a first dichroic mirror region 21 and a second dichroic mirror region 22. The first dichroic mirror region 21 is a region which transmits a first laser beam of the wavelength $\lambda_1$ and a third laser beam of the wavelength $\lambda_3$, but which reflects a second laser beam of the wavelength $\lambda_2$. On the other hand, the second dichroic mirror region 22 is a region which reflects a first laser beam of the wavelength $\lambda_1$ and a third laser beam of the wavelength $\lambda_3$, but which transmits a second laser beam of the wavelength $\lambda_2$. The regions 21 and 22 exhibiting such wavelength selectivity may be, as shown in FIG. 3B, realized by multilayer dielectric films 21L and 22L of different wavelength selectivities being provided at the front side 200F of the beam combiner 200, on a transparent substrate 20 thereof. Examples of dielectrics to compose the multilayer dielectric films 21L and 22L include $SiO_2$, $ZrO_2$, $TiO_2$, $Al_2O_3$, $Ta_2O_5$, $Nb_2O_5$, SiN, AlN, SiON, AlON, and so on. The wavelength selectivity may be adjusted by the refractive index and layer thickness of the dielectric. An antireflection coating may desirably be formed on the rear side 200B of the beam combiner 200.

The transparent substrate 20 may be made of a monocrystal, polycrystal, or glass material. A region in which a multilayer dielectric film 21L that selectively transmits light of the wavelength $\lambda_1$ or $\lambda_3$ and selectively reflects light of the wavelength $\lambda_2$ can be utilized as the first dichroic mirror region 21. A region in which a multilayer dielectric film 22L that selectively reflects light of the wavelength $\lambda_1$ or $\lambda_3$ and selectively transmits light of the wavelength $\lambda_2$ can be utilized as the second dichroic mirror region 22. The multilayer dielectric film 21L and the multilayer dielectric film 22L can be formed by depositing the respective dielectric films on the transparent substrate 20 by sputtering or the like, and patterning them by lithography or the like, for example.

Figure 4A:
FIG. 4A is a cross-sectional view schematically showing another exemplary arrangement for the beam combiner.
Figure 4B:
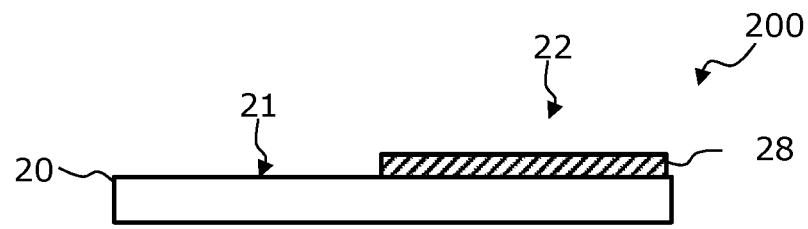
FIG. 4B is a cross-sectional view schematically showing still another exemplary arrangement for the beam combiner.

The beam combiner 200 may be produced by various methods, and may have various arrangements. For example, as shown in FIG. 4A, a component part 26A functioning as the first dichroic mirror region 21 and a component part 26B functioning as the second dichroic mirror region 22 may be coupled together. Alternatively, as shown in FIG. 4B, the arrangement may include a transparent substrate 20 having a portion functioning as the first dichroic mirror region 21 and a component part 28 being fixed on the transparent substrate 20 and functioning as the second dichroic mirror region 22.

FIG. 1 is referred to again. In the example of FIG. 1, the first laser module $100_1$ is disposed at a position for obliquely irradiating the rear side 200B of the beam combiner 200 with a laser beam. On the other hand, the second laser module $100_2$ is disposed at a position for obliquely irradiating the front side 200F of the beam combiner 200 with a laser beam.

More specifically, a B beam (wavelength $\lambda_1$) and a G beam (wavelength $\lambda_3$) going out from the first laser module $100_1$ are incident on the rear side 200B of the first dichroic mirror region 21 of the beam combiner 200, and transmitted through the first dichroic mirror region 21. On the other hand, a B beam (wavelength $\lambda_1$) and a G beam (wavelength $\lambda_3$) going out from the second laser module $100_2$ are incident on the front side 200F of the second dichroic mirror region 22 of the beam combiner 200, and reflected by the second dichroic mirror region 22.

An R beam (wavelength $\lambda_2$) going out from the first laser module $100_1$ is incident on the rear side 200B of the second dichroic mirror region 22 of the beam combiner 200, and transmitted through the second dichroic mirror region 22. On the other hand, an R beam going out from the second laser module $100_2$ is incident on the front side 200F of the first dichroic mirror region 21 of the beam combiner 200, and reflected by the first dichroic mirror region 21.

Figure 5:
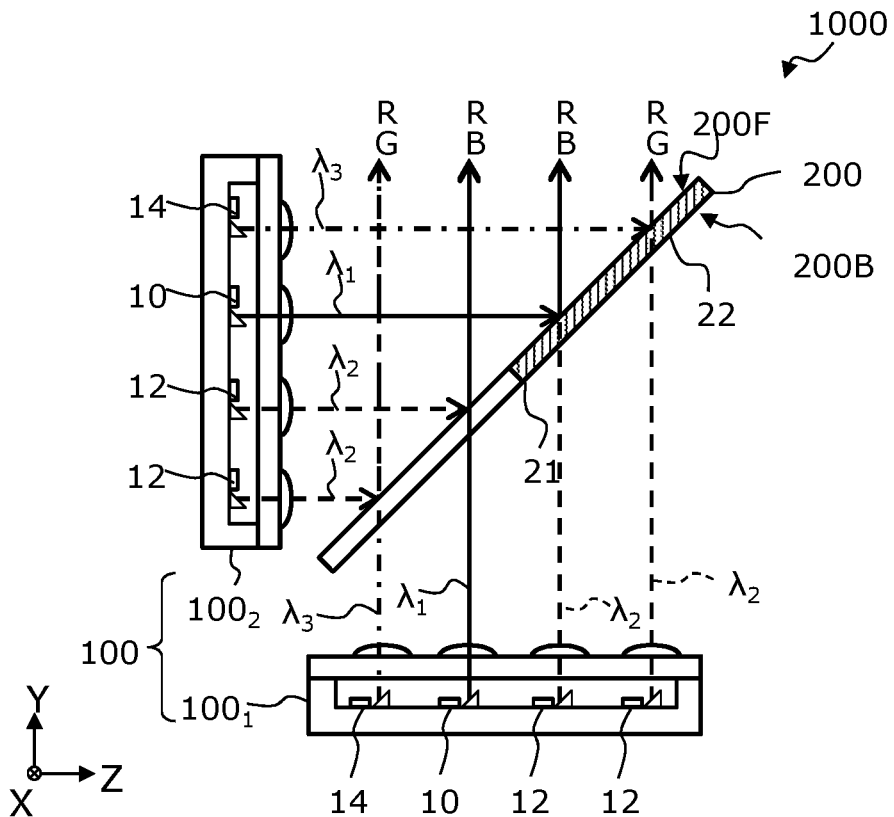
FIG. 5 is a cross-sectional view schematically showing another exemplary arrangement for the light source device according to the first embodiment.

FIG. 1 illustrates each laser beam that is transmitted through the beam combiner 200 and each laser beam that is reflected by the beam combiner 200 as if located on different optical axes. However, as shown in FIG. 5, each transmitted laser beam and each reflected laser beam may be located on the same axis.

Figure 6:
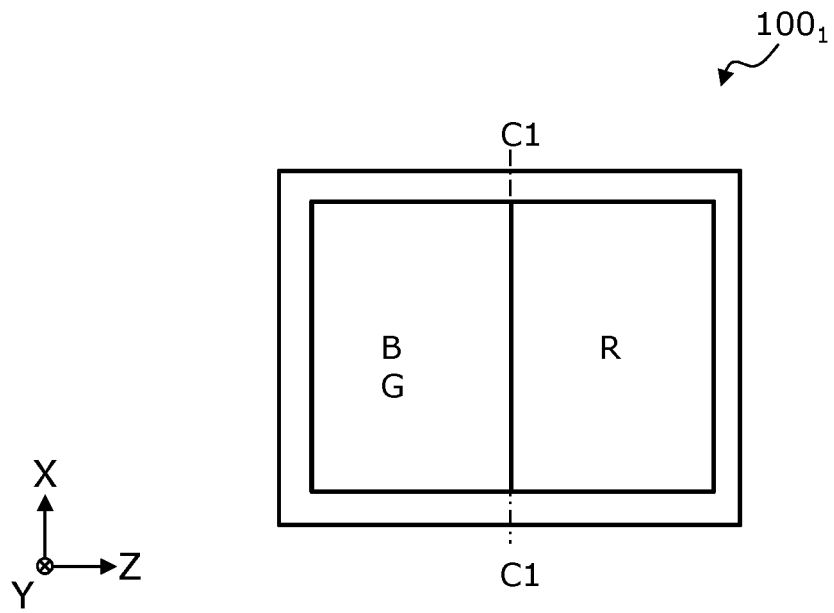
FIG. 6 is a plan view showing an exemplary arrangement for a laser module according to the first embodiment.
Figure 7:
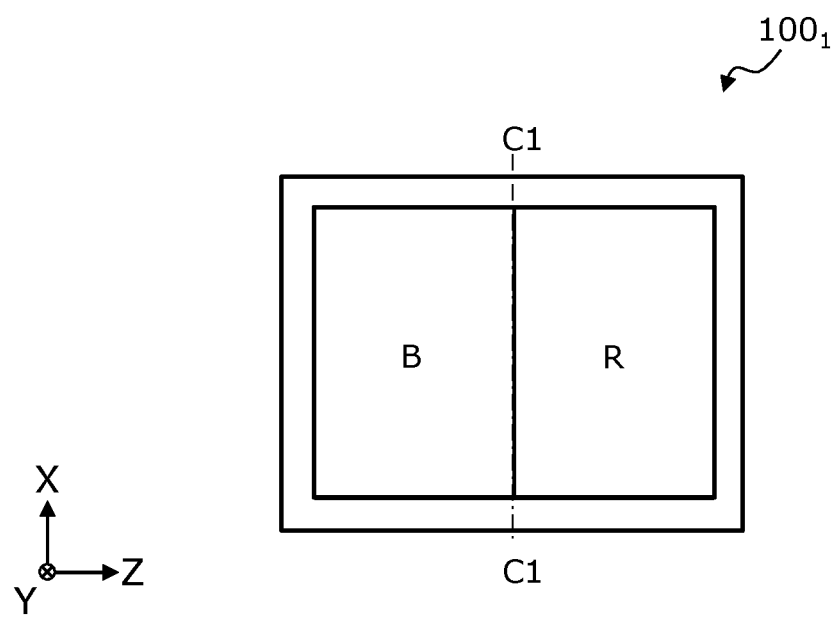
FIG. 7 is a plan view showing another exemplary arrangement for a laser module according to the first embodiment.

In an embodiment of the present disclosure, as has been described with reference to FIG. 2A, LDs which lase at a wavelength that is shorter than the reference wavelength A and LDs which lase at a wavelength that is longer than the reference wavelength A are allocated in regions as partitioned by the border line C1. FIG. 6 is a plan view schematically showing a relationship between: two regions partitioned by the border line C1; and colors (RGB) associated with the lasing wavelengths of the LDs to be disposed in the respective regions. Although the above embodiment illustrates that the green LDs (G) and the blue LDs (B) are arranged on one side of the border line C1, embodiments of the present disclosure are not limited to this example. For example, as shown in FIG. 7, the red LDs (R) may be disposed on the right side of the border line C1, while only the blue LDs (B) may be disposed on the left side. In this case, the first laser module $100_1$ alone will not constitute a light source device that is complete with the three colors of RGB, but the second laser module $100_2$ may include green LDs (G) on the left side of the border line C1, for example, thereby realizing the three colors of RGB. Applications of the light source device 1000 are not limited to light sources of display devices. The light source device 1000 may also be used as a light source for anything other than display devices; and the light source device 1000 may be used as a non-white light source. Although the example of FIG. 6 illustrates that the green LDs (G) and the blue LDs (B) are disposed on the same side, the green LDs (G) may be moved over to the right side of the border line C1, so as to be disposed on the same side as the red LDs (R). In that case, the reflection and transmission characteristics exhibited by the dichroic mirror regions 21 and 22 need to drastically change between the wavelength $\lambda_1$ and the wavelength $\lambda_3$. Regarding the three colors of RGB, the interval between the wavelength $\lambda_1$ and the wavelength $\lambda_2$ is generally wider than the interval between the wavelength $\lambda_1$ and the wavelength $\lambda_3$, which fact makes it easy to adopt the example shown in FIG. 6.

Figure 8:
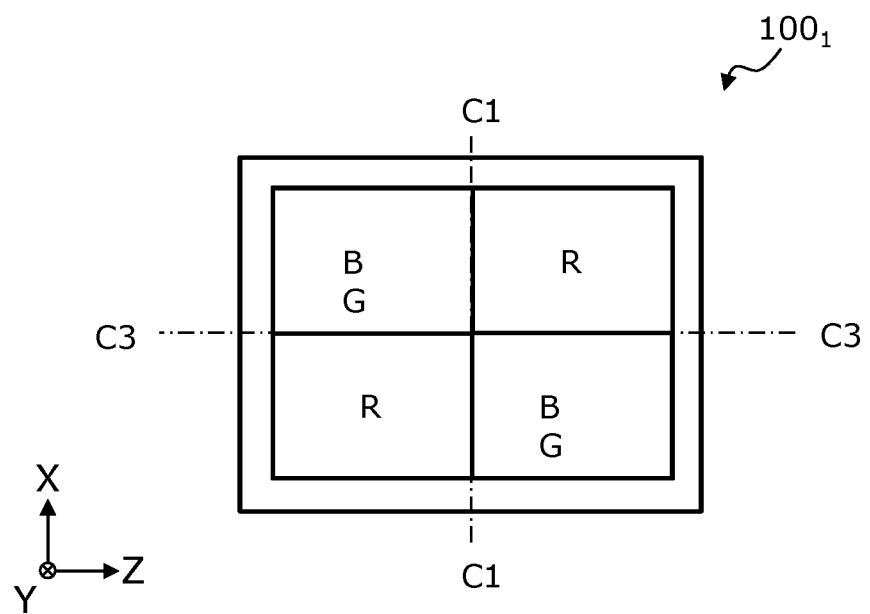
FIG. 8 is a plan view showing still another exemplary arrangement for a laser module according to the first embodiment.
Figure 9:
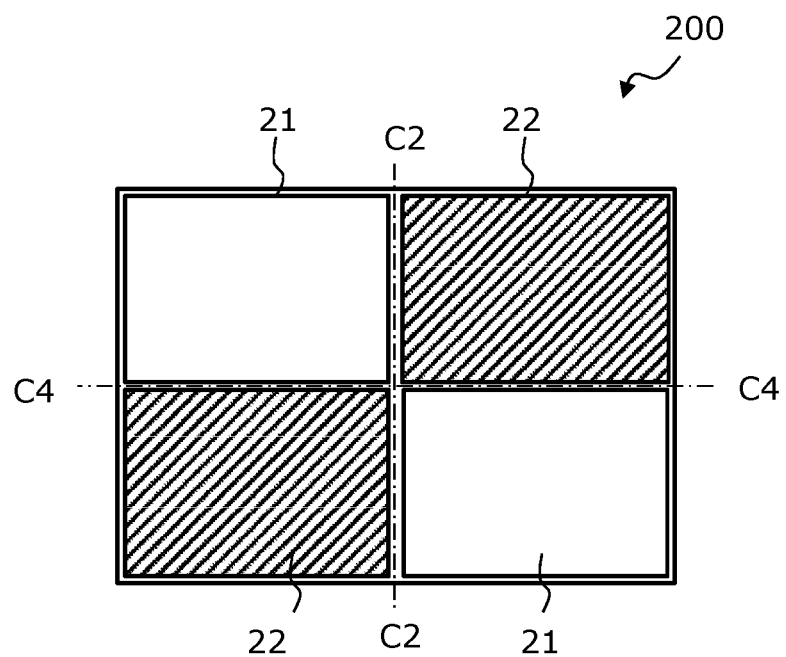
FIG. 9 is a plan view showing another exemplary arrangement for the beam combiner according to the first embodiment.

FIG. 8 is a plan view showing a variant of the first laser module $100_1$. In this example, the LDs on the first laser module $100_1$ are allocated into four regions as partitioned by a border line C1 and a border line C3 that is orthogonal to the border line C1. When the first laser module $100_1$ and the second laser module $100_2$ have the arrangement shown in FIG. 8, the beam combiner 200 may have a structure shown in FIG. 9, for example. In the beam combiner 200 of FIG. 9, first dichroic mirror regions 21 and second dichroic mirror regions 22 are diagonally disposed in four regions as partitioned by a border line C2 and a border line C4 that is orthogonal to the border line C2.

Thus, plenty of freedom is provided for the positioning of LDs on the first laser module $100_1$ and the second laser module $100_2$. However still, in order to allow the first LDs 10, the second LDs 12, and the third LDs 14 to each independently emit light of a different color, for example, there are some preferable positioning layouts. Hereinafter, this aspect will be described.

Figure 10A:
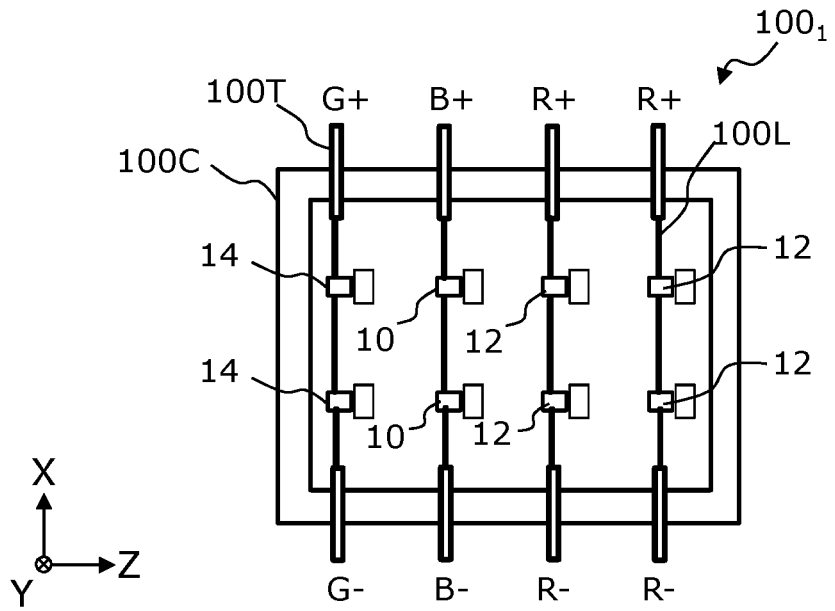
FIG. 10A is a diagram showing an exemplary wiring arrangement in a laser module according to the first embodiment.

FIG. 10A is a diagram showing an example wiring interconnection on the first laser module $100_1$ shown in FIG. 2A. In the example of FIG. 10A, the first laser module $100_1$ includes: LDs 10, 12 and 14 which are provided on a principal face of the base 100C; a plurality of wires 100L electrically connecting LDs associated with the same color; and a plurality of lead terminals 100T for electrically connecting the wires 100L to external driving circuits (not shown). Two first LDs 10 provided side by side along the X axis direction are connected in series, via a wire 100L, between a lead terminal 100T denoted as "B+" and a lead terminal 100T denoted as "B−". Similarly, two third LDs 14 provided side by side along the X axis direction are connected in series, via a wire 100L, between a lead terminal 100T denoted as "G+" and a lead terminal 100T denoted as "G−". As for the second LDs 12, in each column extending along the X axis direction, two second LDs 12 are connected in series, via a wire 100L, between a lead terminal 100T denoted as "R+" and a lead terminal 100T denoted as "R−". A p-side electrode and an n-side electrode of each LD 10, 12 or 14 are electrically connected to nearby wires 100L.

Thus, since a plurality of LDs associated with the same color are mounted side by side in a distinct column for each color, an efficient electrical connection can be realized with a small number of lead terminals 100T. LDs associated with different colors have different electrical resistances, which makes it desirable that their driving circuits be also different. By connecting the first LDs 10, the second LDs 12, and the third LDs 14 to respectively different lead terminals, the first LDs 10, the second LDs 12, and the third LDs 14 can be independently driven. This also permits time division-based light emission of each of the colors of RGB respectively.

Figure 10B:
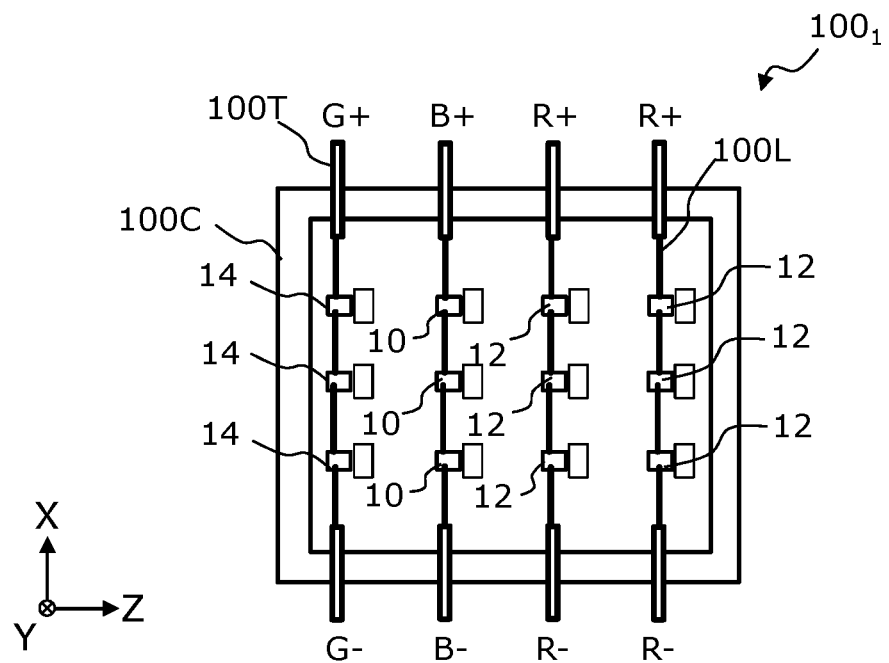
FIG. 10B is a diagram showing another exemplary wiring arrangement in a laser module according to the first embodiment.

FIG. 10B is a plan view showing an exemplary arrangement in which three LDs are provided side by side in each column. Even when the number of LDs is thus increased, there is no need to increase the number of lead terminals 100T. The number of LDs in each column may differ from column to column. The types and numbers of respective LDs are to be determined in accordance with their optical output powers, so that uniform white light will be obtained after merging.

Without being limited to direct connection via the wires 100L, the LDs adjoining along the column direction may also be electrically connected by a conductor layer, or by way of a conductor layer or the like. The positions and shapes of the lead terminals 100T, and the pattern of the wires 100L may be arbitrary, without being limited to the illustrated example.

Figure 11A:
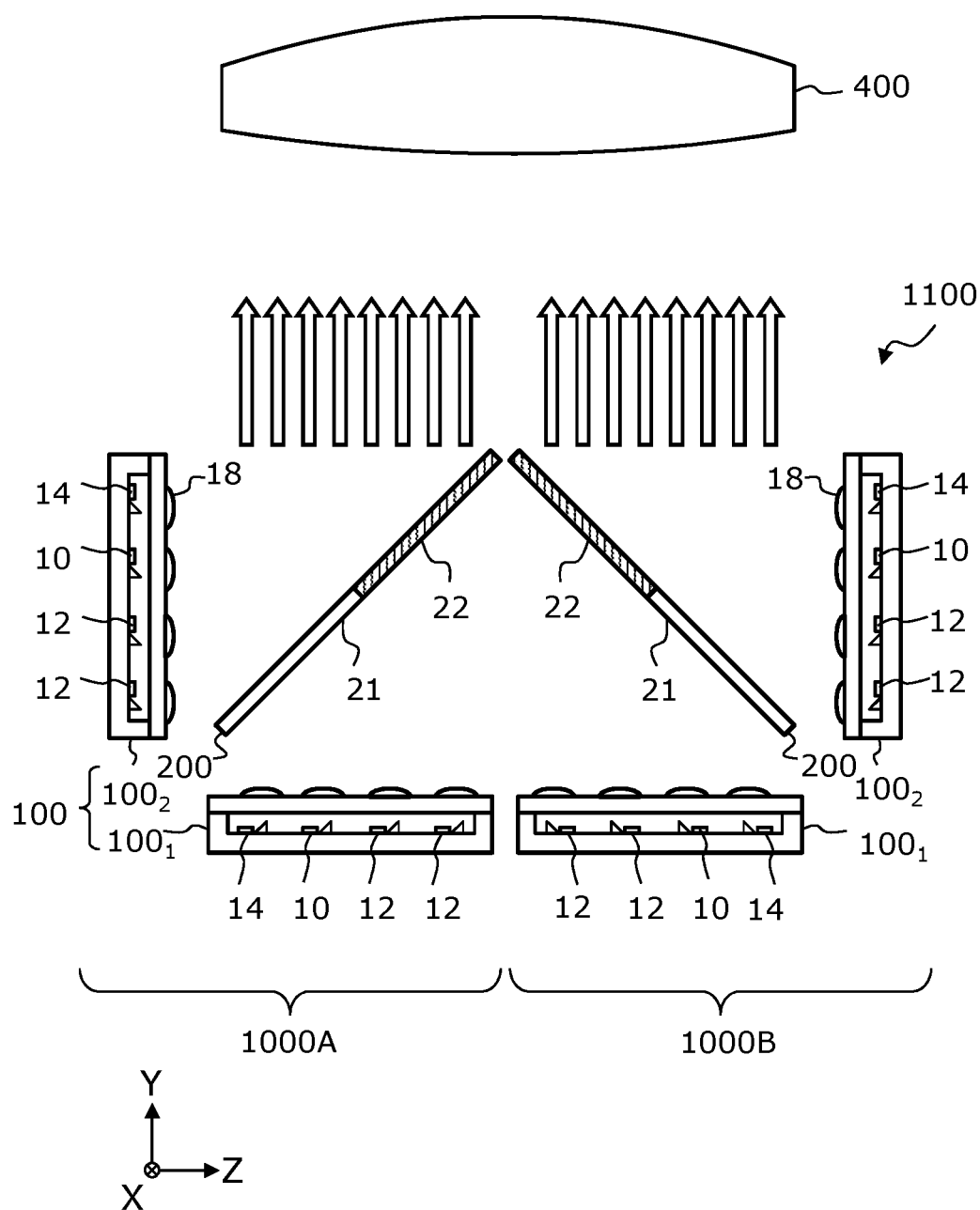
FIG. 11A is a diagram showing a light source device according to a variant of the first embodiment.

FIG. 11A is a diagram showing a light source device 1100 according to a variant of the present embodiment. The light source device 1100 includes a plurality of light source units 1000A and 1000B each having a similar arrangement to the light source device 1000 in FIG. 1. Laser beams which are emitted from the light source units 1000A and 1000B are propagated in substantially the same direction by optics including a lens 400. In the example of FIG. 11A, the light source unit 1000A on the left side and the light source unit 1000B on the right side are in a mirror-symmetric relative positioning; however, embodiments of the present disclosure are not limited to this example. FIG. 11B is a diagram showing a light source device 1200 according to another variant. Instead of the light source unit 1000B in FIG. 11A, the light source device 1200 includes a light source unit 1000C. With respect to the light source unit 1000A on the left side, the light source unit 1000C is of such a relationship that the orientation of the second laser module $100_2$ is turned upside down, and that the beam combiner 200 is rotated clockwise by 90 degrees around an axis which is parallel to the X axis.

Thus, with the construction shown in FIG. 11A or FIG. 11B, laser beams which are emitted from the four laser modules 100 are combined. The number of light source units to be included in each light source device 1100, 1200 is not limited to two. The construction shown in FIG. 11A or FIG. 11B may alternatively be arranged along a direction (the X axis direction) which is perpendicular to the plane of the figure.

Note that, as has been described earlier, it is not necessary for one laser module 100 to include all of the first LDs 10, the second LDs 12, and the third LDs 14. For example, in a light source device 1300 shown in FIG. 12, the first laser module $100_1$ and the second laser module $100_2$ respectively include: at least one first LD 10 which emits a first laser beam(s) of the wavelength $\lambda_1$ (B beam); and at least one second LD 12 which emits a second laser beam(s) of the wavelength $\lambda_2$ (R beam). The first dichroic mirror region 21 transmits a first laser beam (B beam) which is emitted from the first laser module $100_1$, and reflects a second laser beam (R beam) which is emitted from the second laser module $100_2$. The second dichroic mirror region 22 transmits a second laser beam (R beam) which is emitted from the first laser module $100_1$ and reflects a first laser beam (B beam) which is emitted from the second laser module $100_2$.

Figure 12:
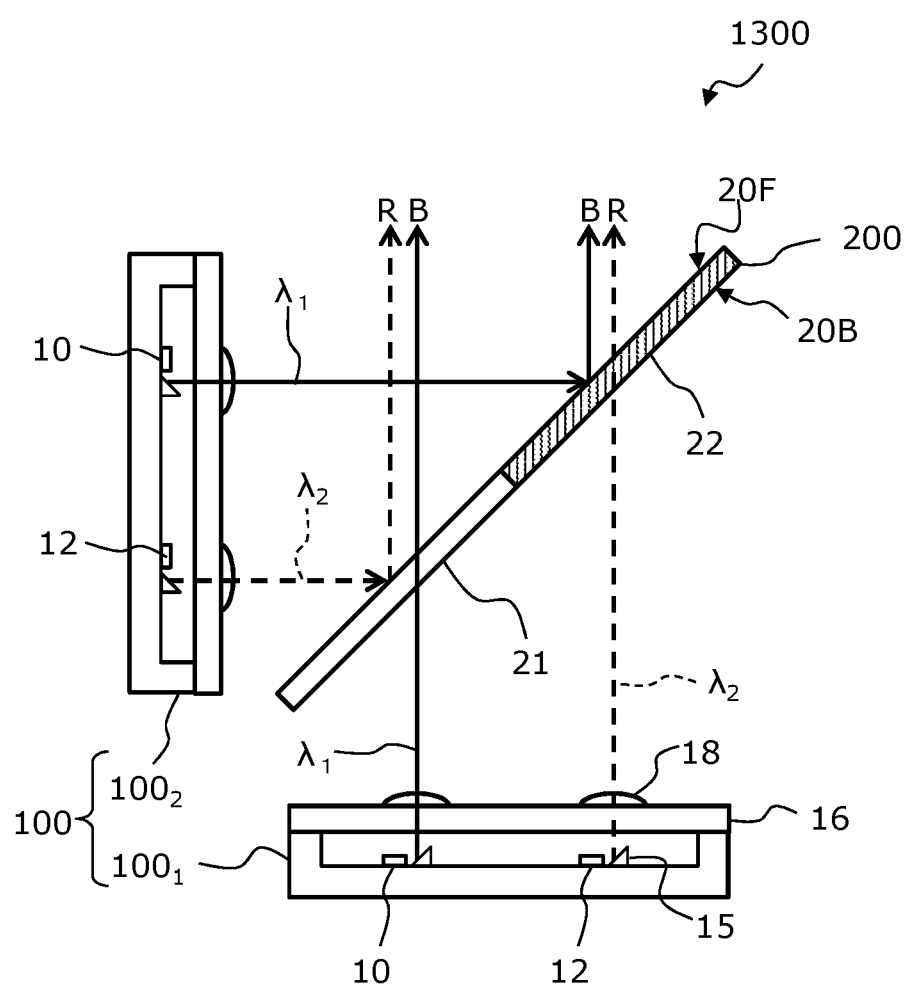
FIG. 12 is a cross-sectional view showing another exemplary arrangement for the light source device according to the first embodiment.

By itself, the light source device 1300 shown in FIG. 12 does not output three colors of RGB. Therefore, in the case where the light source device 1300 is used as a light source for a display device such as a laser projector, laser light of the missing color (e.g. green) may be provided by another light source. For example, in the light source device 1100 of FIG. 11A, the light source units 1000A and 1000B may have the structure of the light source device 1300 shown in FIG. 12. In that case, for example, the light source unit 1000A may emit an R beam and a B beam, while the light source unit 1000B may emit an R beam and a G beam.

Embodiment 2

Next, with reference to FIGS. 13 through 17C, a light source device according to a second embodiment of the present disclosure will be described.

Figure 13:
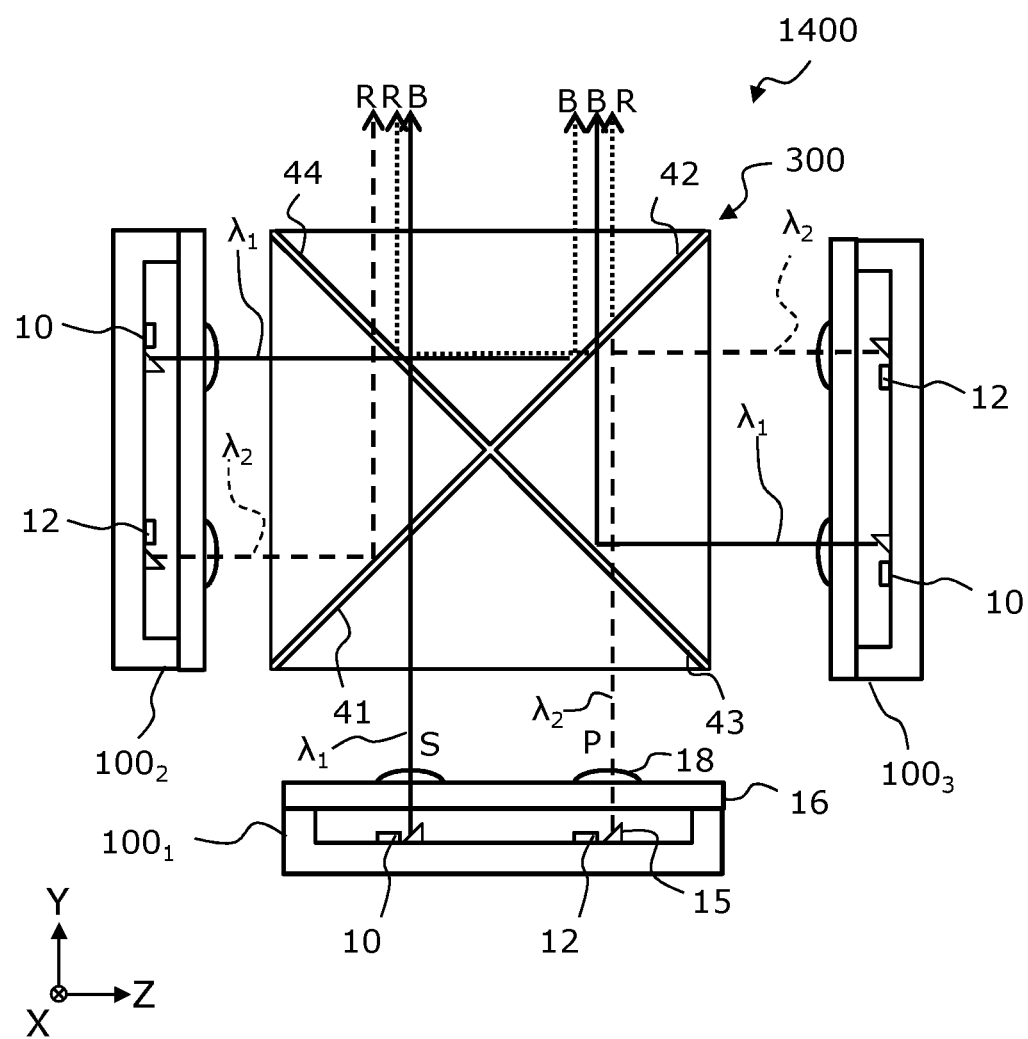
FIG. 13 is a cross-sectional view showing an exemplary arrangement of a light source device according to a second embodiment of the present disclosure.

First, with reference to FIG. 13, an exemplary overall construction of a light source device 1400 according to the present embodiment will be described. The light source device 1400 includes a first laser module $100_1$, a second laser module $100_2$, and a third laser module $100_3$ which are oriented in directions each differing by 90 degrees. In the present embodiment, the laser modules $100_1$, $100_2$ and $100_3$ all have the same arrangement, and therefore may be collectively referred to as the "laser modules 100". In the present embodiment, too, the positive direction along the Y axis is referred to as "the front side", whereas the negative direction along the Y axis is referred to as "the rear side".

Each of the plurality of laser modules 100 includes at least one first LD 10 which emits a first laser beam(s) (wavelength $\lambda_1$) and at least one second LD 12 which emits a second laser beam(s) (wavelength $\lambda_2$), such that the relationship $\lambda_1 < \lambda_2$ is satisfied. $\lambda_1$ is contained in e.g. the blue wavelength region (430 to 480 nm), whereas $\lambda_2$ is contained in e.g. the red wavelength region (620 to 660 nm). Hereinafter, the first laser beam (wavelength $\lambda_1$) will be referred to a B beam, and the second laser beam (wavelength $\lambda_2$) as an R beam. Each laser module 100 may be identical in arrangement to the laser module 100 shown in FIG. 1. Herein, for simplicity, the description will not detail at least one third LD to emit a third laser beam (wavelength $\lambda_3$); the third laser beam (wavelength $\lambda_3$) is to be treated similarly to the first laser beam (wavelength $\lambda_1$).

Figure 14A:
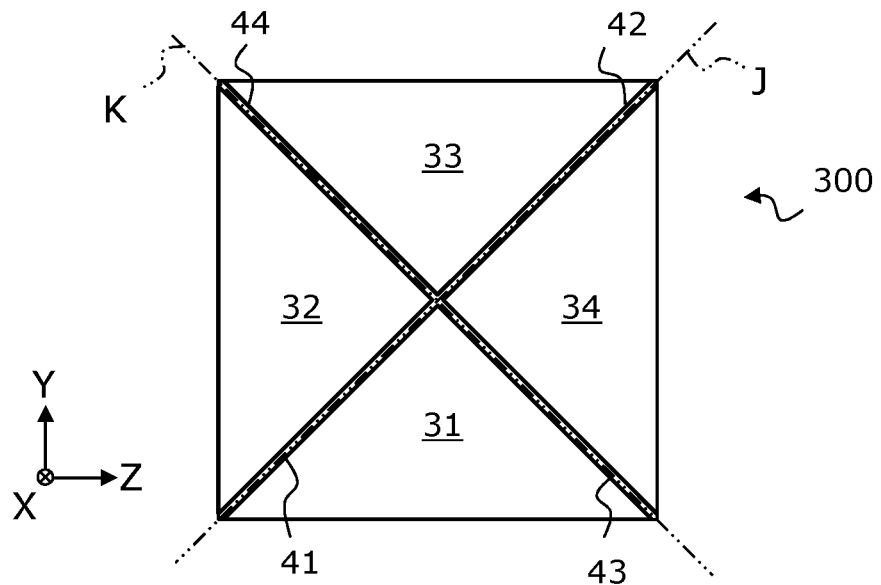
FIG. 14A is a cross-sectional view showing an exemplary arrangement of a beam combiner in FIG. 13.

The light source device 1400 includes a beam combiner 300 which combines a plurality of laser beams emitted from the laser modules 100. Hereinafter, with reference to FIG. 14A and FIG. 14B, the beam combiner 300 according to the present embodiment will be described in detail. FIG. 14A is a cross-sectional view showing an exemplary arrangement of the beam combiner 300, and FIG. 14B is a schematic exploded diagram thereof.

The beam combiner 300 according to the present embodiment is produced by combining four triangular prisms 31, 32, 33 and 34 which are transparent with respect to visible light. Hereinafter, a "triangular prism" will simply be referred to as a "prism". The prisms 31 to 34 each have the shape of a geometrical triangular prism extending along the X axis direction, and may be made of a monocrystal, polycrystal, or glass material. In the illustrated example, a cross section of each geometrical triangular prism taken parallel to the YZ plane is an isosceles triangle having a vertex angle of 90 degrees. The first prism 31 and the second prism 32 adjoin each other via an imaginary first plane J. Similarly, the third prism 33 and the fourth prism 34 adjoin each other via the first plane J. Moreover, the first prism 31 and the fourth prism 34 adjoin each other via an imaginary second plane K, whereas the second prism 32 and the third prism 33 adjoin each other via the second plane K. As shown in FIG. 14B, the first plane J and the second plane K intersect each other at a line of intersection O extending along the X axis direction.

The beam combiner 300 as such includes: a first optical film 41 and a second optical film 42 provided side by side along the first plane J with the line of intersection O interposed therebetween; and a third optical film 43 and a fourth optical film 44 provided side by side along the second plane K with the line of intersection O interposed therebetween. As will be described later, the optical films 41 to 44 have wavelength selectivity and/or polarization selectivity, and exhibit different optical characteristics (reflectance and transmittance) depending on the wavelength and polarization of incident light. Moreover, the second optical film 42 and the fourth optical film 44 include half-wave plates ($\lambda/2$ phase plates) for light of respectively different wavelengths.

Figure 14B:
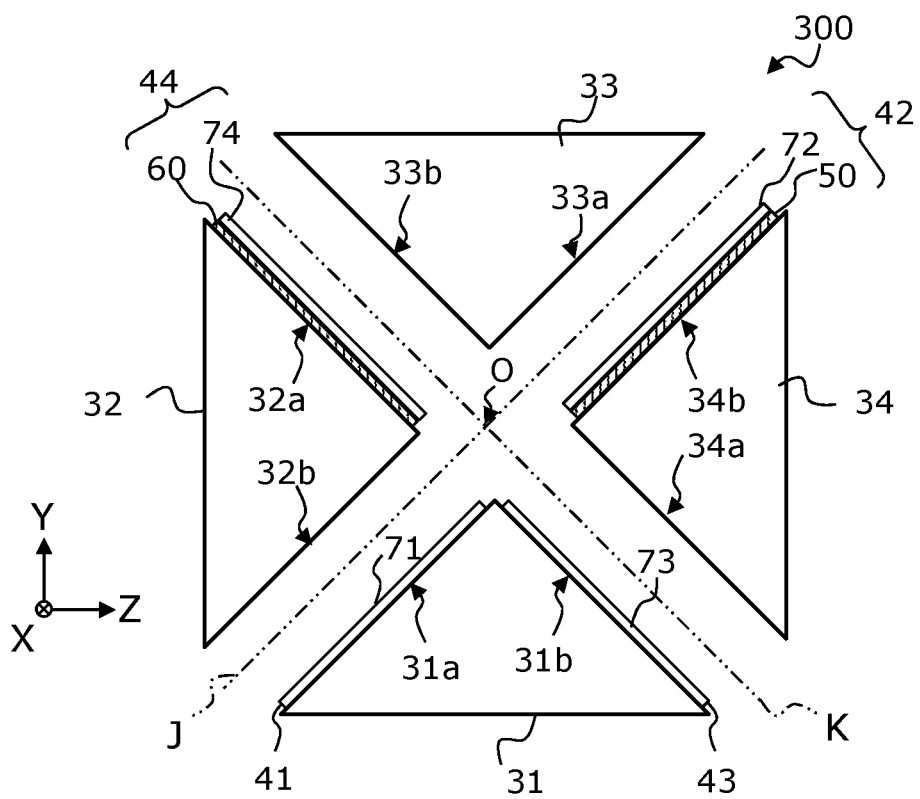
FIG. 14B is a schematic exploded diagram showing the beam combiner of the exemplary arrangement in FIG. 14A.

FIG. 14B schematically shows a state before the prisms 31, 32, 33 and 34 are combined into one beam combiner 300. The first prism 31 includes a first slope 31a and a second slope 31b, whereas the second prism 32 includes a first slope 32a and a second slope 32b. The third prism 33 includes a first slope 33a and a second slope 33b, whereas the fourth prism 34 includes a first slope 34a and a second slope 34b.

In the example shown in FIG. 14B, the first optical film 41 is provided on the first slope 31a of the first prism 31, whereas the second optical film 42 is provided on the second slope 34b of the fourth prism 34. The third optical film 43 is provided on the second slope 31b of the first prism 31, whereas the fourth optical film 44 is provided on the first slope 32a of the second prism 32. Such positioning is only an example. For instance, the first optical film 41 may be provided on the second slope 32b of the second prism 32, and the second optical film 42 may be provided on the first slope 33a of the third prism 33.

FIG. 13 is referred to again.

The first laser module $100_1$ is disposed at a position for obliquely irradiating the rear side of the first and fourth optical films 41 and 44 with a B beam (wavelength $\lambda_1$), and obliquely irradiating the rear side of the second and third optical films 42 and 43 with an R beam (wavelength $\lambda_2$).

The second laser module $100_2$ is disposed at a position for obliquely irradiating the front side of the second optical film 42 with a B beam (wavelength $\lambda_1$), and obliquely irradiating the front side of the first optical film 41 with an R beam (wavelength $\lambda_2$).

The third laser module $100_3$ is opposed to the second laser module $100_2$ with the beam combiner 300 interposed therebetween, and is disposed at a position for obliquely irradiating the front side of the third optical film 43 with a B beam (wavelength $\lambda_1$), and obliquely irradiating the front side of the fourth optical film 44 with an R beam (wavelength $\lambda_2$).

In the present embodiment, a B beam (wavelength $\lambda_1$) emitted from a first LD 10 is light (S-polarized light) which is linearly-polarized along the first direction (the X axis direction). As used herein, S-polarized light means linearly polarized light whose polarization axis (i.e., the orientation of its electric field vector) is perpendicular to the plane of incidence (the YZ plane). Linearly polarized light whose polarization axis is parallel to the plane of incidence (the YZ plane) is P-polarized light. In the present embodiment, an R beam (wavelength $\lambda_2$) emitted from a second LD 12 is light (P-polarized light) which is linearly-polarized along a second direction (the Z axis direction or the Y axis direction) that is orthogonal to the first direction.

Referring back to FIG. 14B, the first optical film 41 includes a first dichroic film 71 which transmits a B beam and reflects an R beam. The second optical film 42 includes: a $\lambda/2$ phase plate 50 for the R beam which rotates the polarization direction of an R beam by 90 degrees; and a second dichroic film 72. The second dichroic film 72 transmits an R beam and a B beam of S-polarized light, but reflects a B beam of P-polarized light. The third optical film 43 includes a third dichroic film 73 which transmits an R beam and reflects a B beam. The fourth optical film 44 includes: a $\lambda/2$ phase plate 60 for the B beam which rotates the polarization direction of a B beam by 90 degrees; and a fourth dichroic film 74. The fourth dichroic film 74 transmits a B beam and an R beam of P-polarized light, but reflects an R beam of S-polarized light.

Figure 15:
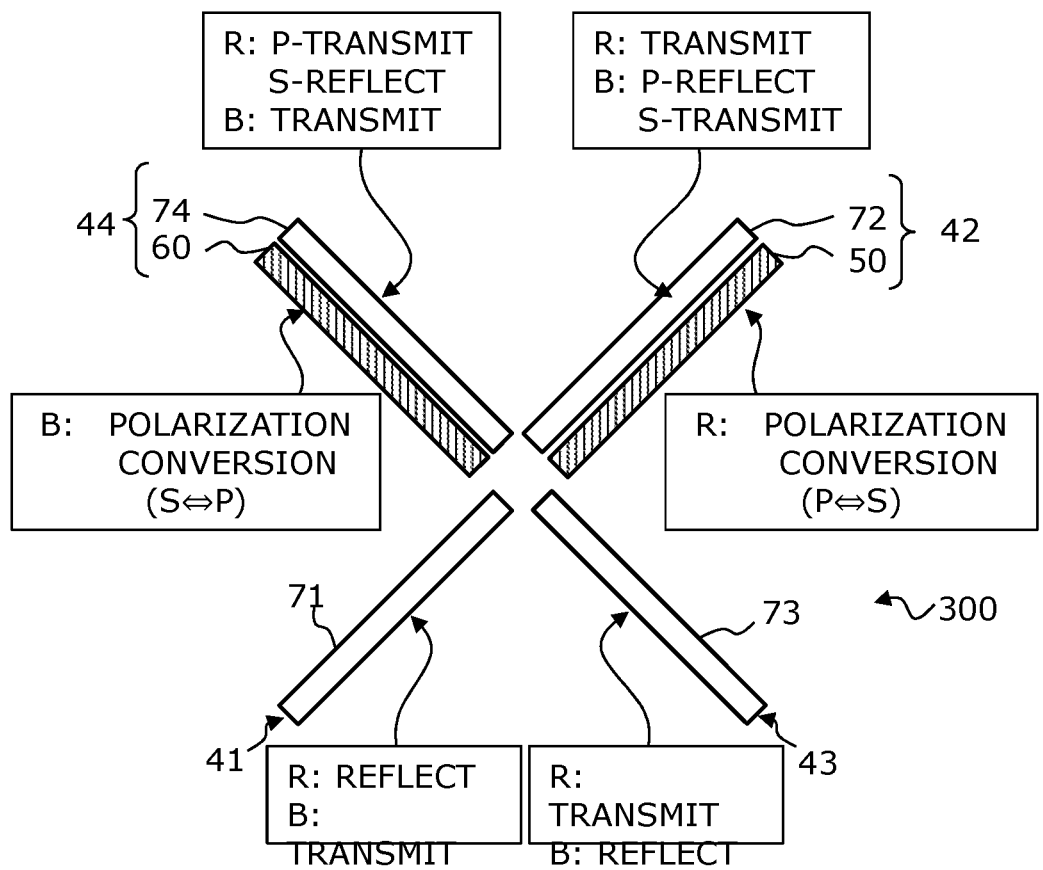
FIG. 15 is a diagram showing the functionality of a beam combiner according to the second embodiment.
Figure 16:
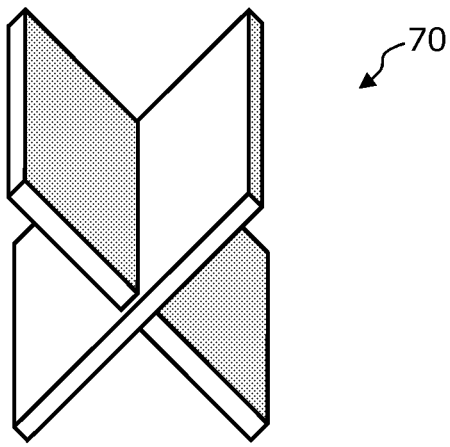
FIG. 16 is a perspective view showing another exemplary arrangement for the beam combiner according to the second embodiment.

FIG. 15 is a diagram schematically showing the functions of the first to fourth optical films 41 to 44. The thickness of each component element is exaggerated in the figure. The thickness of any constituent element, when in film shape, may be about 200 nm to several μm, for example. In the present embodiment, the first to fourth optical films 41 to 44 are supported by using four prisms, but any kind of transparent members other than prisms, e.g., transparent members 70 in plate shape intersecting each other as shown in FIG. 16, may be used.

Figure 17A:
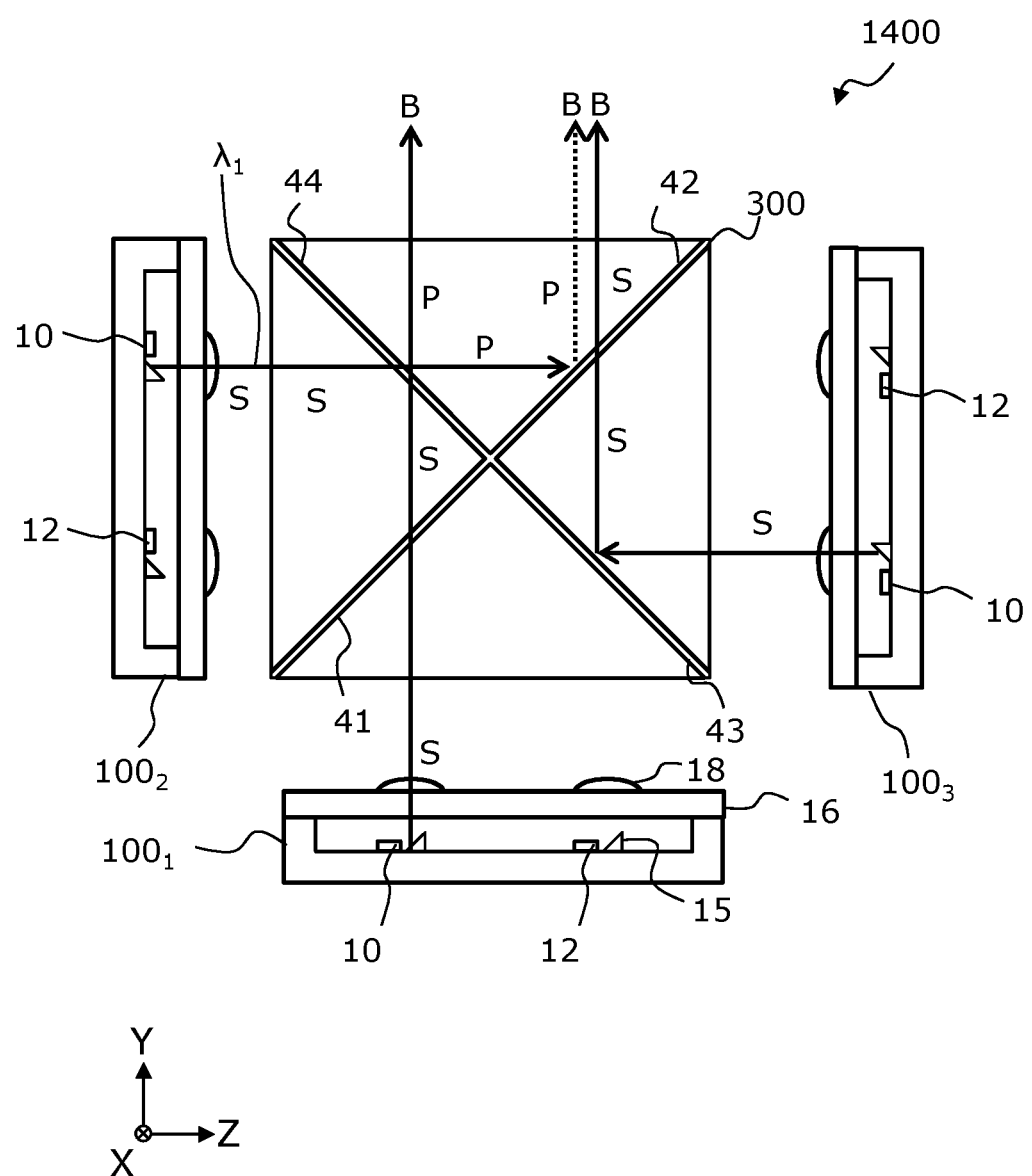
FIG. 17A is a diagram showing the operation of the light source device according to the second embodiment.
Figure 17B:
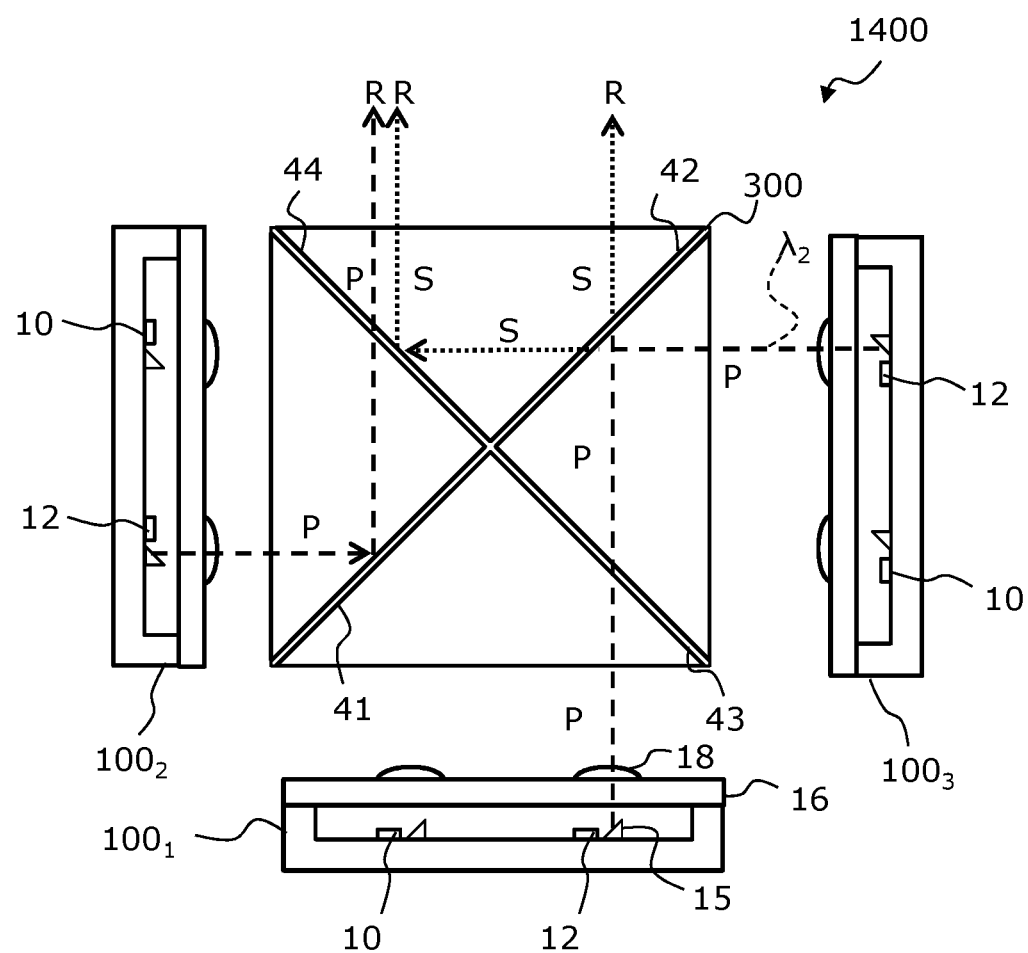
FIG. 17B is another diagram showing the operation of the light source device according to the second embodiment.
Figure 17B:
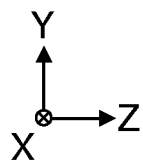

FIG. 17A and FIG. 17B are cross-sectional views schematically showing the operation of the light source device 1400. FIG. 17A shows how B beams (wavelength $\lambda_1$) emitted from the first LDs 10 on the laser modules $100_1$ to $100_3$ may be transmitted and reflected. FIG. 17B shows how R beams (wavelength $\lambda_2$) emitted from the second LDs 12 on the laser modules $100_1$ to $100_3$ may be transmitted and reflected.

As shown in FIG. 17A, a B beam emitted from the first LD 10 on the first laser module $100_1$ is transmitted through the first optical film 41 and the fourth optical film 44, and goes out from the beam combiner 300. A B beam emitted from the first LD 10 on the second laser module $100_2$ is transmitted through the fourth optical film 44.

Specifically, owing to the action of the $\lambda/2$ phase plate 60 for the B beam shown in FIG. 15, after it is converted from S-polarized light to P-polarized light, it is transmitted through the fourth dichroic film 74. After being transmitted through the fourth optical film 44 in FIG. 17A, the B beam of P-polarized light is reflected by the second optical film 42 (second dichroic film 72), and goes out from the beam combiner 300. A B beam emitted from the first LD 10 on the third laser module $100_2$ is reflected by the third optical film 43 and thereafter transmitted through the second optical film 42, and goes out from the beam combiner 300. When transmitted through the second optical film 42, this B beam is not converted by the $\lambda/2$ phase plate 50 for the R beam shown in FIG. 15 into P-polarized light, but is intactly transmitted through the second dichroic film 72.

Next, FIG. 17B and FIG. 15 are referred to. First, as shown in FIG. 17B, an R beam emitted from the second LD 12 on the first laser module $100_1$ is transmitted through the third optical film 43 and the second optical film 42, and goes out from the beam combiner 300. When transmitted through the second optical film 42, the R beam is converted from P-polarized light into S-polarized light by the $\lambda/2$ phase plate 50 for the R beam shown in FIG. 15. The second dichroic film 72 included in the second optical film 42 transmits an R beam without any dependence on polarization. An R beam emitted from the second LD 12 on the second laser module $100_2$ is reflected by the first optical film, and then transmitted through the fourth optical film 44.

Specifically, the $\lambda/2$ phase plate 60 for the B beam shown in FIG. 15 does not effect polarization conversion for any R beam of P-polarized light, which is therefore transmitted through the fourth dichroic film 74. An R beam emitted from the second LD 12 on the third laser module $100_3$ is transmitted through the second optical film 42 and thereafter reflected by the fourth optical film 44, and goes out from the beam combiner 300. When transmitted through the second optical film 42, this R beam is converted from P-polarized light into S-polarized light by the $\lambda/2$ phase plate 50 for the R beam, and therefore is reflected by the fourth dichroic film 74 included in the fourth optical film 44.

Thus, with the light source device 1400 according to the present embodiment, the respective B beams and R beams emitted from the three laser modules $100_1$ to $100_3$ can be combined (multiplexed) either simultaneously or by way of time division. Each laser modules $100_1$ to $100_3$ may include a third LD 14 described with reference to the first embodiment; G beams of S-polarized light (wavelength $\lambda_3$) emitted from the third LDs 14 will be subjected to transmission, reflection, and polarization conversion by the first to fourth optical films 41 to 44, in the same manner as are the B beams.

Figure 17C:
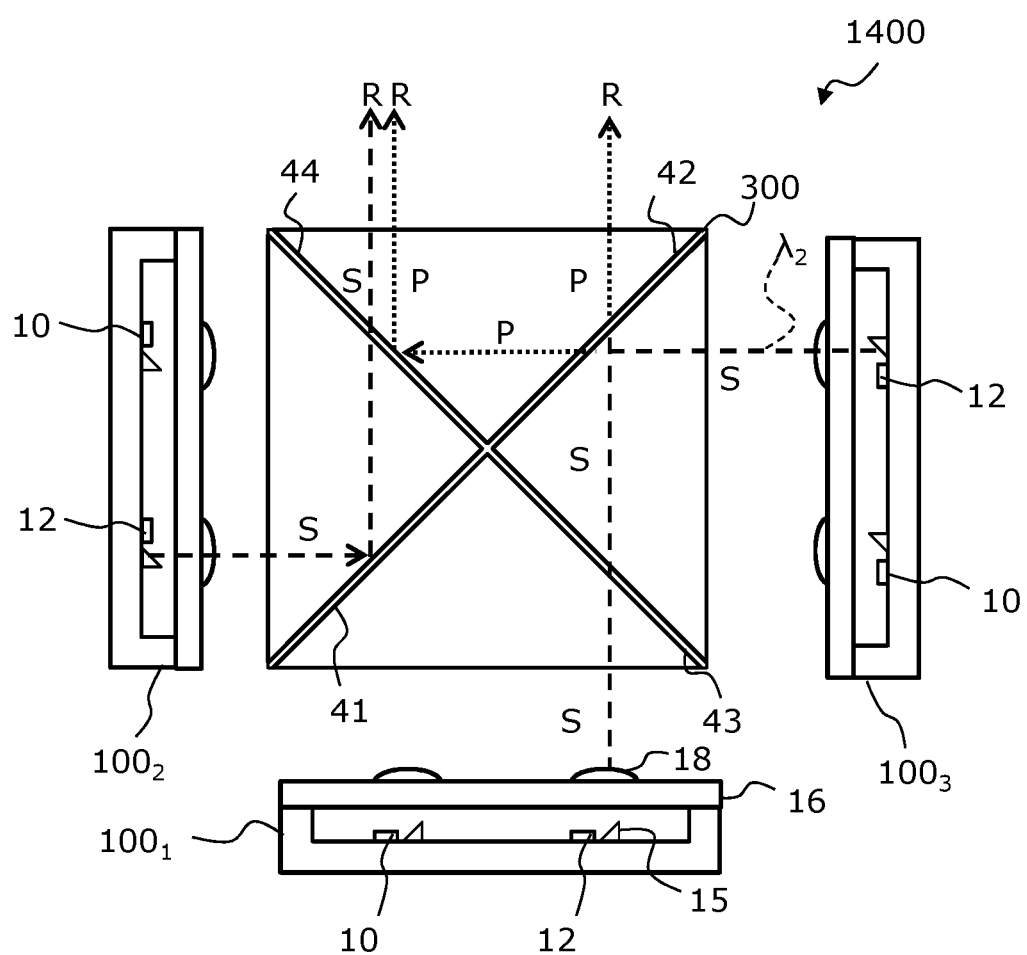
FIG. 17C is a diagram showing the operation of a light source device according to a variant of the second embodiment.

In the above embodiment, B beams of S-polarized light are emitted from the first LDs 10, and R beams of P-polarized light are emitted from the second LDs 12. The light source device 1400 according to the present disclosure is not limited to such an example. The polarization of the laser beam emitted from each LD may vary depending on the LD structure or the orientation in which the LD chip is positioned. For example, R beams of S-polarized light may be emitted from the second LDs 12 as shown in FIG. 17C, whereas B beams of S-polarized light may be emitted from first LDs 10. In that case, the fourth dichroic film 74 in the fourth optical film 44 may be changed to a film which reflects an R beam of P-polarized light and transmits an R beam of S-polarized light. Note that no change will be required in the ability to transmit the B beams.

From the above, the fourth dichroic film 74 may transmit light of the wavelength $\lambda_1$ (e.g. a B beam), transmit light of the wavelength $\lambda_2$ not passing through the $\lambda/2$ phase plate 50 for the wavelength $\lambda_2$ ($\lambda/2$ phase plate for the R beam), and reflect light of the wavelength $\lambda_2$ having passed through the $\lambda/2$ phase plate 50 for the wavelength $\lambda_2$.

Embodiment 3

Figure 18:
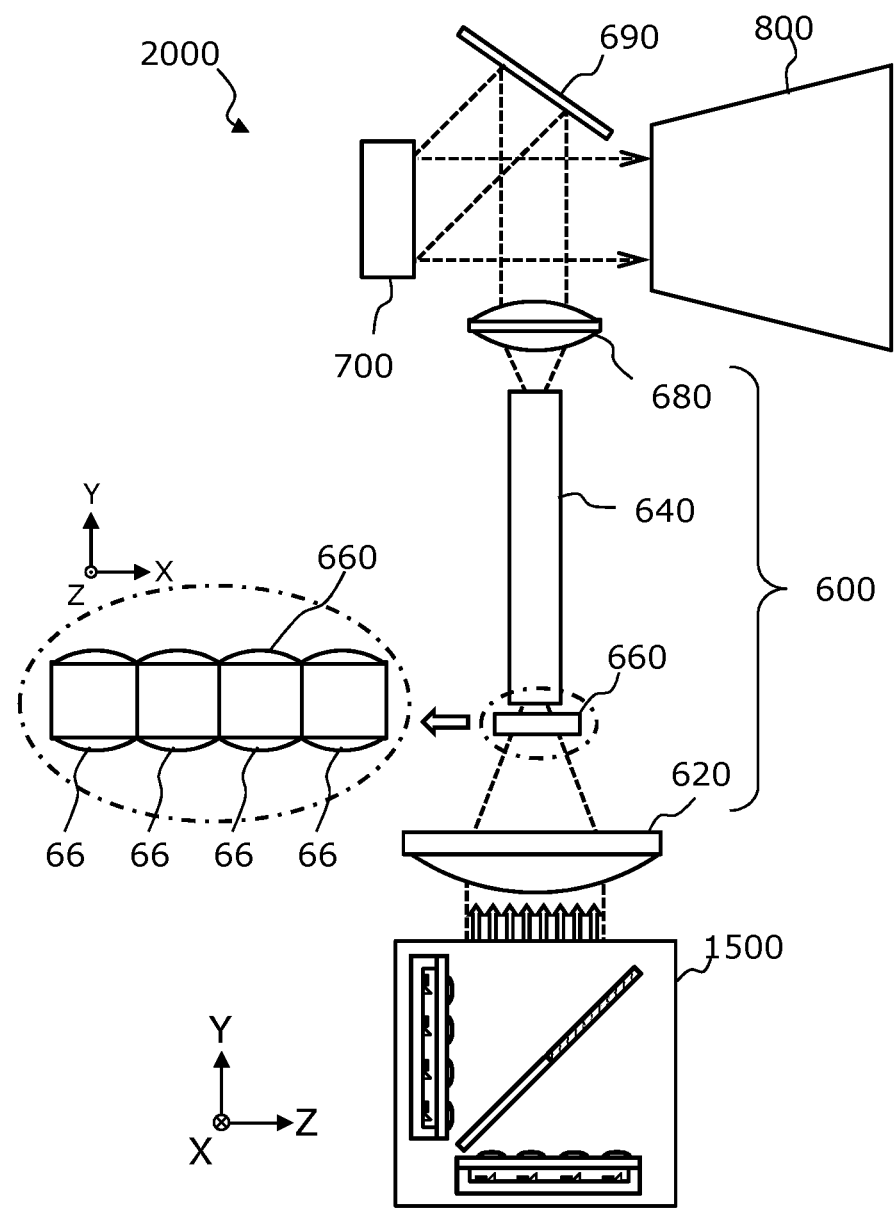
FIG. 18 is a cross-sectional view showing an exemplary arrangement of an optical engine according to an embodiment of the present disclosure.

Hereinafter, with reference to FIG. 18, an optical engine according to an embodiment of the present disclosure will be described.

The optical engine 2000 according to the present embodiment includes a light source device 1500, optics 600, a spatial light modulator 700, and projection optics 800. The light source device 1500 may be a light source device according to the present disclosure, and may have a structure similar to that of the light source device 1000 shown in FIG. 1, for example. A laser beam going out from the light source device 1500 enters the optics 600. In FIG. 18, the laser beam is schematically represented as a region between a pair of broken lines. The laser beam going out from the light source device 1500 is, as has been described earlier, a beam in which laser beams emitted from the plurality of LDs 10, 12 and 14 are combined (multiplexed). Therefore, the laser beam going out from the light source device 1500 is a bundle of laser beams (an R beam, a G beam, and a B beam). The diameter (beam diameter) of each of the R beam, the G beam, and the B beam may be defined by the size of a region that has an optical intensity which is e.g. $1/e^2$ or greater with respect to the optical intensity at the respective beam center. Herein, e is Napier's constant (about 2.71). The beam diameter may be defined based on other standards. An R beam, a G beam, or a B beam emitted from a laser diode does not have a circular cross-sectional shape, but rather an elliptical cross-sectional shape. Immediately after going out from the light source device 1500, the R beam, the G beam, and the B beam have not been uniformly mixed, and their radiance distribution is not uniform. Before the spatial light modulator 700 is irradiated with the laser beam, the bundle of the R beam, the G beam, and the B beam may desirably be subjected to homogenization in order to render the radiance distributions of these beams as spatially uniform as possible.

The spatial light modulator 700 is irradiated with a laser beam which has passed through a portion of the optics 600 that achieves the aforementioned homogenization. The optics 600 include a collimating lens 680 and a reflection mirror 690, such that the reflection mirror 690 directs the laser beam toward the spatial light modulator 700. The spatial light modulator 700, which is composed of e.g. a digital micro mirror device (DMD) or an image displaying panel such as a liquid crystal display panel (LCD), modulates the intensity distribution of the laser beam so that it will exhibit an image pattern constituting a motion video or a still image. The spatial light modulator 700 receives image data from an image processor not shown, and performs an operation for displaying. The projection optics 800 allows a laser beam having been modulated by the spatial light modulator 700 to be projected onto the surface of an object (e.g., a screen or a wall surface of a building), thus creating an image. The projection optics 800 may include a plurality of lenses for altering the lateral magnification of displaying.

The optics 600 according to the present embodiment include: a converging lens 620 to focus a laser beam (a bundle of the R beam, the G beam, and the B beam) going out from the light source device 1500; and an integrator (a multiplexing optical component) 640 through which the laser beam having been focused by the converging lens 620 is passed. For an enhanced homogeneity of light, the converging lens 620 preferably has a large aberration (e.g., spherical aberration). The integrator 640 includes a rod integrator and/or a light tunnel, for example. As a laser beam passes inside the integrator 640, the laser beam will repeatedly undergo reflection, whereby its spatial mixing is promoted. As a result of such multiple reflections, the intensity distribution in a plane perpendicular to the propagation direction of the laser beam becomes more uniform than before entering the integrator 640. As such homogenization of intensity distribution progresses with respect to each of the R beam, the G beam, and the B beam, white light which is uniformed as a whole is generated. Note that the R beam, the G beam, and the B beam do not need to simultaneously propagate inside the integrator 640, but may propagate therein by way of time division according to the present embodiment. This will allow a full-color image to be displayed by one spatial light modulator 700 (field sequential method). The optical engine 2000 according to the present embodiment creates an R image, a G image, and a B image with laser light which is superior in monochromaticity to that from LEDs, and thus may provide a greater color gamut for expression.

In the present embodiment, the optics 600 further include an array toroidal lens 660 disposed between the lens 620 and the integrator 640. Each of the R beam, the G beam, and the B beam has, after being emitted from the LD, an elliptical beam shape having a minor axis and a major axis in a far field pattern. The beam divergence angle is relatively small along the minor axis direction, but relatively large along the major axis direction. The array toroidal lens 660 functions to enlarge the beam divergence angle in directions of small divergence angle. The array toroidal lens 660 according to the present embodiment includes four contiguous toroidal lens regions 66. The number of toroidal lens region 66 may desirably be three or more. In each toroidal lens region 66, a curvature in a plane that contains the beam propagation direction and the minor axis of the beam diameter (the YX plane in FIG. 18) is greater than a curvature in a plane that contains the propagation direction and the major axis (i.e., the YZ plane in FIG. 18). Such arrangement allows a beam to be selectively diverged in directions of relatively small divergence angle.

Thus, when a laser beam having anisotropy in terms of divergence angle is incident on the integrator 640, the array toroidal lens 660 enlarges the beam divergence angle so as to increase the number of multiple reflections occurring inside the integrator 640. When a light tunnel is used as the integrator 640, insertion of the array toroidal lens 660 allows the length of light tunnel to be reduced from about 100 mm to about 30 mm, for example. According to the present embodiment, while downsizing the optics 600 by reducing the length of the integrator 640, illumination light with an enhanced in-plane uniformity of radiance can be generated. As a result, a high image quality can be realized that has not been attainable with conventional projectors.

Without being limited to the optical engine 2000 according to the present embodiment, an optical engine according to the present disclosure may take a variety of arrangements. An R beam, a G beam, and a B beam may simultaneously go out from the light source device 1500, and be split into an R beam, a G beam, and a B beam by a beam splitter having wavelength selectivity. In that case, the R beam, the G beam, and the B beam are to be modulated by separate spatial light modulators.

Each embodiment described above is an exemplary illustration of a light source device or an optical engine that embodies the technological concept of the present invention, rather than a limitation to the present invention. The present specification is not intended to limit any member that is recited in the claims to a member in an embodiment. Unless otherwise specified, the dimensions, materials, shapes, relative positioning, etc., of the component parts described in each embodiment are mere examples for explanation purposes, rather than limiting the scope of the present invention. The elements constituting the present invention may be implemented in such a manner that a plurality of elements are composed of the same single member that serves as the plurality of elements, or that the functions of one member is split among a plurality of members.

A light source device according to the present disclosure is applicable to various technological fields. For example, it may be used in optical engines, lighting devices, and headlamps for onboard uses. An optical engine according to the present disclosure is applicable to a display device such as projector or a rear-projection television.

What is claimed is:

1. A light source device, comprising:
a plurality of laser modules including a first laser module and a second laser module, each laser module including at least one first laser diode configured to emit a first laser beam and at least one second laser diode configured to emit a second laser beam, said second laser beam having a wavelength which is longer than a wavelength of the first laser beam; and
a beam combiner including
a first dichroic mirror region configured to transmit the first laser beam going out from the first laser module, and to reflect the second laser beam going out from the second laser module, and
a second dichroic mirror region configured to transmit the second laser beam going out from the first laser module, and to reflect the first laser beam going out from the second laser module,
wherein the first laser module is disposed at a position for obliquely irradiating a rear side of the beam combiner with the first laser beam and the second laser beam going out from the first laser module; and wherein
the second laser module is disposed at a position for obliquely irradiating a front side of the beam combiner with the first laser beam and the second laser beam going out from the second laser module.

2. The light source device of claim 1, wherein each of the plurality of laser modules includes:
a hermetic package housing the first laser diode and the second laser diode; and
a plurality of collimating lenses including at least one first collimating lens configured to be passed through by the first laser beam and at least one second collimating lens configured to be passed through by the second laser beam.

3. The light source device of claim 1, wherein each of the plurality of laser modules includes wiring for connecting the first laser diode and the second laser diode respectively to a plurality of terminals that are electrically independent of each other.

4. The light source device of claim 1, wherein each of the plurality of laser modules includes:
a plurality of said first laser diodes which are arranged in at least one row; and
a plurality of said second laser diodes which are arranged in at least one row.

5. The light source device of claim 1, wherein the first laser module and the second laser module are disposed orthogonal to each other.

6. The light source device of claim 1, wherein
each of the plurality of laser modules further includes at least one third laser diode configured to emit a third laser beam;
the at least one third laser beam is configured to have a wavelength which is between the wavelength of the first laser beam and the wavelength of the second laser beam;
the first dichroic mirror region is configured to transmit the third laser beam; and wherein
the second dichroic mirror region is configured to reflect the third laser beam.

7. The light source device of claim 6, wherein
the first laser beam comprises a blue laser beam;
the second laser beam comprises a red laser beam; and
the third laser beam comprises a green laser beam.

8. An optical engine, comprising:
at least one light source device according to claim 1;
optics configured such that a laser beam emitted from the at least one light source device is incident thereto;
a spatial light modulator configured to be irradiated with the laser beam having passed through the optics; and
projection optics configured to project the laser beam having been modulated by the spatial light modulator.

9. The optical engine of claim 8, wherein
the optics include:
a lens to focus the laser beam going out from the at least one light source device; and
an integrator through which the laser beam having been focused by the lens is passed.

10. The optical engine of claim 9, wherein the integrator comprises a rod integrator or a light tunnel.

11. The optical engine of claim 9, wherein
the optics include an array toroidal lens disposed between the lens and the integrator;
the laser beam configured to be incident on the array toroidal lens is configured to have an elliptical beam shape having a minor axis and a major axis; and wherein
the array toroidal lens comprises a plurality of toroidal lens regions in each of which a curvature in a plane that contains a propagation direction of the laser beam and the minor axis is greater than a curvature in a plane that contains the propagation direction and the major axis.

12. A light source device, comprising:
a first laser module, a second laser module, and a third laser module, each including
at least one first laser diode configured to emit a first laser beam having a wavelength $\lambda_1$ and being linearly-polarized along a first direction, and
at least one second laser diode configured to emit a second laser beam having a wavelength $\lambda_2$ which is longer than the wavelength $\lambda_1$ and being linearly-polarized along the first direction or along a second direction which is orthogonal to the first direction;
said light source device further comprising
a beam combiner disposed between the third laser module and the second laser module and configured to combine the first laser beam and the second laser beam emitted from each of the first laser module, the second laser module, and the third laser module, the beam combiner including
a first optical film including a first dichroic film configured to transmit light of the wavelength $\lambda_1$ and to reflect light of the wavelength $\lambda_2$,
a second optical film including a $\lambda/2$ phase plate for the wavelength $\lambda_2$ configured to rotate a polarization direction of light of the wavelength $\lambda 2$ by 90 degrees, and a second dichroic film configured to transmit light of the wavelength $\lambda_2$, transmit light of the wavelength $\lambda_1$ being polarized along the first direction, and to reflect light of the wavelength $\lambda_1$ being polarized along the second direction, the second optical film and the first optical film being provided side by side along a first plane,
a third optical film including a third dichroic film configured to transmit light of the wavelength $\lambda_2$ and to reflect light of the wavelength $\lambda_1$, and a fourth optical film including a λ/2 phase plate for the wavelength $\lambda_1$ configured to rotate a polarization direction of light of the wavelength $\lambda_1$ by 90 degrees, and a fourth dichroic film configured to transmit light of the wavelength $\lambda_1$, transmit light of the wavelength $\lambda_2$ not passing through the λ/2 phase plate for the wavelength $\lambda_2$, and to reflect light of the wavelength $\lambda_2$ having passed through the λ/2 phase plate for the wavelength $\lambda_2$, the fourth optical film and the third optical film being provided side by side along a second plane, wherein, the first plane and the second plane intersects at a line of intersection between the first optical film and the second optical film and between the third optical film and the fourth optical film;

the first laser module is disposed at a position for obliquely irradiating rear sides of the first optical film, the second optical film, the third optical film, and the fourth optical film with the first laser beam and the second laser beam going out from the first laser module;

the second laser module is disposed at a position for obliquely irradiating front sides of the second optical film and the first optical film with the first laser beam and the second laser beam going out from the second laser module; and wherein the third laser module is disposed at a position for obliquely irradiating front sides of the third optical film and the fourth optical film with the first laser beam and the second laser beam going out from the third laser module.

13. The light source device of claim 12, wherein the second laser beam comprises light which is linearly-polarized along the second direction; and wherein the fourth dichroic film is configured to transmit light of the wavelength $\lambda_1$, transmit light of the wavelength $\lambda_2$ being polarized along the second direction, and reflect light of the wavelength $\lambda_2$ being polarized along the first direction.

14. An optical engine, comprising:

at least one light source device according to claim 8;

optics configured such that a laser beam emitted from the at least one light source device is incident thereto;

a spatial light modulator to be irradiated with the laser beam having passed through the optics; and projection optics configured to project the laser beam having been modulated by the spatial light modulator.

15. The optical engine of claim 14, wherein the optics include:

a lens to focus the laser beam going out from the at least one light source device; and an integrator configured such that the laser beam having been focused by the lens is passed there through.

16. The optical engine of claim 15, wherein the integrator comprises a rod integrator or a light tunnel.

17. The optical engine of claim 15, wherein the optics include an array toroidal lens disposed between the lens and the integrator;

the laser beam is configured to be incident on the array toroidal lens has an elliptical beam shape having a minor axis and a major axis; and wherein the array toroidal lens comprises a plurality of toroidal lens regions in each of which a curvature in a plane that contains a propagation direction of the laser beam and the minor axis is greater than a curvature in a plane that contains the propagation direction and the major axis.

\* \* \* \* \*